United States Patent
France et al.

(10) Patent No.: US 9,211,030 B2
(45) Date of Patent: Dec. 15, 2015

(54) STEAM COOKING APPARATUS

(75) Inventors: David France, Omaha, NE (US); Steven Robert Baker, Omaha, NE (US)

(73) Assignee: ConAgra Foods RDM, Inc., Omaha, NE (US)

( * ) Notice: Subject to any disclaimer, the term of this patent is extended or adjusted under 35 U.S.C. 154(b) by 1153 days.

(21) Appl. No.: 11/423,259

(22) Filed: Jun. 9, 2006

(65) Prior Publication Data

US 2007/0090103 A1    Apr. 26, 2007

Related U.S. Application Data

(60) Provisional application No. 60/728,468, filed on Oct. 20, 2005.

(51) Int. Cl.
*A47J 29/04* (2006.01)
*A47J 27/16* (2006.01)

(52) U.S. Cl.
CPC ........................................ *A47J 27/16* (2013.01)

(58) Field of Classification Search
CPC ......... A47J 36/20; A47J 36/022; A47J 36/30; B65D 81/343; B65D 81/3453
USPC ........... 99/410, 415, 418, 417, 426, 403, 450, 99/339; 426/234, 120; 220/201, 573.1, 220/560.01, 495.03
See application file for complete search history.

(56) References Cited

U.S. PATENT DOCUMENTS

| | | | |
|---|---|---|---|
| 113,893 A | 4/1871 | Joyce et al. | 220/762 |
| 166,102 A | 7/1875 | Hennaman | 220/525 |
| 177,593 A | 5/1876 | Van Skelline | |
| 181,823 A | 9/1876 | Cornwall | 99/425 |
| 241,254 A | 5/1881 | Udell | |
| 254,770 A | 3/1882 | Hurd | 99/450 |
| 472,002 A | 3/1892 | Ross | |
| 541,397 A | 6/1895 | Swartout | 220/573.5 |
| 590,212 A | 9/1897 | Daesch | 99/416 |
| 637,838 A | 11/1899 | Vernon | |

(Continued)

FOREIGN PATENT DOCUMENTS

| | | |
|---|---|---|
| CH | 672 585 | 12/1989 |
| DE | 28 10 175 A1 | 9/1979 |

(Continued)

OTHER PUBLICATIONS

International Search Report and Written Opinion mailed Jan. 12, 2009.

(Continued)

*Primary Examiner* — Dana Ross
*Assistant Examiner* — Renee L Miller
(74) *Attorney, Agent, or Firm* — Ryan T. Grace; Advent, LLP

(57) ABSTRACT

The present invention relates to a cooking apparatus, typically for microwave ovens and the like, that has separate compartments for different foods or food components. These separate compartments are such that food components are kept separate during storage, prior to cooking or heating, as well as during cooking or heating, avoiding unwanted mixing of the food components. The apparatus includes compartments configured such that steam, generated by the heating of a food component in a lower compartment is used to steam cook or heat a food component in an upper compartment.

17 Claims, 16 Drawing Sheets

(56) References Cited

U.S. PATENT DOCUMENTS

| | | | |
|---|---|---|---|
| 851,983 A | 4/1907 | Entringer | 210/314 |
| 899,244 A | 9/1908 | Chase | 99/412 |
| 902,181 A | 10/1908 | Tidow | 99/408 |
| 948,198 A | 2/1910 | Wiegand | 99/417 |
| 952,572 A | 3/1910 | Meyer | 99/413 |
| 955,033 A | 4/1910 | Wing | 99/428 |
| 1,004,423 A | 9/1911 | Hanlon | 220/759 |
| 1,099,603 A | 6/1914 | Ingersoll | |
| 1,263,004 A | 4/1918 | Tollagsen | 126/369 |
| 1,341,960 A | 6/1920 | Meyer et al. | 220/592.23 |
| 1,347,428 A | 7/1920 | Wittekind | 220/573.4 |
| 1,476,910 A | 12/1923 | Naugle | |
| 1,519,510 A | 12/1924 | Santarsiero | 99/416 |
| 1,630,787 A | 5/1927 | Cullen | 99/416 |
| 1,765,862 A | 6/1930 | Clapp | |
| 1,864,081 A | 6/1932 | Marr | |
| 1,906,592 A | 5/1933 | Hiester | |
| 1,944,089 A | 1/1934 | Litchfield | 150/9 |
| 1,985,978 A | 5/1934 | Thomas | 426/113 |
| 2,021,465 A | 11/1935 | Ritscher | 99/403 |
| 2,039,374 A | 5/1936 | Young | |
| 2,041,227 A | 5/1936 | Chalmers | 229/87 |
| 2,107,480 A | 2/1938 | Holton | 126/377.1 |
| 2,149,872 A | 3/1939 | Schmidt | 229/58 |
| 2,200,977 A | 5/1940 | Baxter | 426/95 |
| 2,271,921 A | 2/1942 | Luker | |
| 2,290,396 A | 7/1942 | Webster | |
| 2,540,036 A | 1/1951 | Spencer | |
| 2,556,115 A | 6/1951 | Smith | 99/417 |
| 2,559,101 A | 7/1951 | Wool | |
| 2,576,862 A | 11/1951 | Smith et al. | |
| 2,591,578 A | 4/1952 | McNealy et al. | |
| 2,600,566 A | 6/1952 | Moffett | |
| 2,650,485 A | 9/1953 | La Greca | 220/23.83 |
| 2,660,529 A | 11/1953 | Bloom | |
| 2,667,422 A | 1/1954 | Kauffman | |
| 2,673,805 A | 3/1954 | Colman | 99/171 |
| 2,673,806 A | 3/1954 | Colman | 99/171 |
| 2,714,070 A | 7/1955 | Welch | |
| 2,741,559 A | 4/1956 | Banowitz | 99/171 |
| 2,777,769 A | 1/1957 | Hodges | 426/113 |
| 2,801,930 A | 8/1957 | Paulucci | 99/193 |
| 2,805,392 A | 9/1957 | Schnoll | 324/706 |
| 2,852,898 A | 9/1958 | Berg | 53/182 |
| 2,858,970 A | 11/1958 | Barnes et al. | 229/55 |
| 2,865,768 A | 12/1958 | Barnes et al. | 99/171 |
| D185,399 S | 6/1959 | Tupper | |
| 2,960,218 A | 11/1960 | Cheeley | |
| 2,961,520 A | 11/1960 | Long | |
| 2,965,501 A | 12/1960 | Harriss | 426/120 |
| 3,012,895 A | 12/1961 | Stelnicki | |
| 3,027,261 A | 3/1962 | Samara | 99/171 |
| 3,035,754 A | 5/1962 | Meister | 229/53 |
| 3,052,554 A | 9/1962 | Colman | 99/171 |
| 3,068,779 A | 12/1962 | Eidlisz | 99/416 |
| 3,070,275 A | 12/1962 | Bostrom | 229/4.5 |
| 3,107,989 A | 10/1963 | Fesco | 55/381 |
| 3,109,359 A | 11/1963 | Falla | 99/339 |
| 3,141,400 A | 7/1964 | Powers | |
| 3,179,036 A | 4/1965 | Luker | |
| 3,191,520 A | 6/1965 | Halter | |
| 3,219,460 A | 11/1965 | Brown | |
| 3,220,635 A | 11/1965 | Kasting et al. | 229/57 |
| 3,220,856 A | 11/1965 | Vischer | |
| 3,240,610 A | 3/1966 | Cease | |
| 3,244,537 A | 4/1966 | Cease | |
| 3,246,446 A | 4/1966 | Powers | |
| 3,262,668 A | 7/1966 | Luker | |
| 3,271,169 A | 9/1966 | Baker et al. | |
| 3,286,832 A | 11/1966 | Pilger | 206/56 |
| 3,287,140 A | 11/1966 | Brussell | |
| 3,293,048 A | 12/1966 | Kitterman | 99/171 |
| 3,326,097 A | 6/1967 | Lokey | 93/82 |
| 3,326,363 A * | 6/1967 | Bennett et al. | 206/219 |
| 3,349,941 A | 10/1967 | Wanderer | 220/23.88 |
| 3,353,327 A | 11/1967 | Cutler et al. | 53/28 |
| 3,353,707 A | 11/1967 | Eyles | 206/519 |
| 3,357,152 A | 12/1967 | Geigel | 53/29 |
| 3,396,868 A | 8/1968 | Fitzgerald | 206/508 |
| 3,420,397 A | 1/1969 | Miller | 220/203.09 |
| 3,421,654 A | 1/1969 | Hexel | |
| 3,424,342 A | 1/1969 | Scopp et al. | 220/793 |
| 3,441,418 A * | 4/1969 | Nishikiori | 426/283 |
| 3,445,050 A | 5/1969 | Peters et al. | |
| 3,447,714 A | 6/1969 | Elliot | 206/1.5 |
| 3,489,075 A | 1/1970 | O'Reilly | 99/450 |
| 3,502,483 A * | 3/1970 | Klose et al. | 426/575 |
| 3,521,788 A | 7/1970 | Carter et al. | |
| 3,547,661 A | 12/1970 | Stevenson | |
| 3,573,430 A * | 4/1971 | Eisler | 219/385 |
| 3,608,770 A * | 9/1971 | Naimoli | 220/575 |
| 3,610,135 A | 10/1971 | Sheridan | |
| 3,610,458 A | 10/1971 | Nissley | |
| 3,615,646 A | 10/1971 | Neely et al. | |
| 3,620,834 A | 11/1971 | Duffy | 117/213 |
| 3,637,132 A | 1/1972 | Gray | 229/53 |
| 3,638,784 A | 2/1972 | Bodolay et al. | 206/45.34 |
| 3,641,926 A | 2/1972 | Williams et al. | 99/448 |
| 3,647,508 A | 3/1972 | Gorrell | 117/38 |
| 3,669,688 A | 6/1972 | Thompson | |
| 3,718,480 A | 2/1973 | Tremblay et al. | |
| 3,741,427 A * | 6/1973 | Doyle | 220/573.4 |
| 3,777,447 A | 12/1973 | Herbine et al. | 53/36 |
| 3,811,374 A | 5/1974 | Mann | |
| 3,835,280 A | 9/1974 | Gades et al. | 219/10.55 |
| 3,836,042 A | 9/1974 | Petitto | |
| 3,844,409 A | 10/1974 | Bodolay et al. | 206/45.34 |
| 3,851,574 A | 12/1974 | Katz et al. | 426/107 |
| 3,865,301 A | 2/1975 | Pothier et al. | |
| 3,873,735 A | 3/1975 | Chalin et al. | 426/87 |
| 3,881,027 A | 4/1975 | Levinson | |
| 3,884,213 A | 5/1975 | Smith | |
| 3,884,383 A | 5/1975 | Burch et al. | |
| 3,893,567 A | 7/1975 | Davis et al. | 206/520 |
| 3,908,029 A | 9/1975 | Fredrickson | |
| 3,938,730 A | 2/1976 | Detzel et al. | 229/120.01 |
| 3,941,967 A | 3/1976 | Sumi et al. | |
| 3,956,866 A | 5/1976 | Lattur | 53/29 |
| 3,965,323 A | 6/1976 | Forker, Jr. et al. | |
| 3,970,241 A | 7/1976 | Hanson | 229/58 |
| 3,973,045 A | 8/1976 | Brandberg et al. | 426/110 |
| 3,974,353 A | 8/1976 | Goltsos | |
| 3,975,552 A | 8/1976 | Stangroom | |
| 3,983,256 A | 9/1976 | Norris et al. | |
| 3,985,990 A | 10/1976 | Levinson | |
| 4,018,355 A | 4/1977 | Ando | |
| 4,031,261 A | 6/1977 | Durst | |
| 4,036,423 A | 7/1977 | Gordon | 229/43 |
| 4,038,425 A | 7/1977 | Brandberg et al. | 426/107 |
| 4,043,098 A | 8/1977 | Putnam, Jr. et al. | 53/180 M |
| 4,065,583 A | 12/1977 | Ahlgren | |
| 4,077,853 A | 3/1978 | Coll-Palagos | 204/20 |
| 4,079,853 A | 3/1978 | Casutt | |
| 4,082,184 A | 4/1978 | Hammer | 206/519 |
| 4,082,691 A | 4/1978 | Berger | |
| 4,096,948 A | 6/1978 | Kuchenbecker | |
| 4,113,095 A | 9/1978 | Dietz et al. | |
| 4,118,913 A | 10/1978 | Putnam, Jr. et al. | 53/551 |
| 4,126,945 A | 11/1978 | Manser et al. | |
| 4,132,811 A | 1/1979 | Standing et al. | 426/111 |
| 4,133,896 A | 1/1979 | Standing et al. | |
| 4,136,505 A | 1/1979 | Putnam, Jr. et al. | 53/551 |
| 4,137,333 A * | 1/1979 | Daswick | 426/120 |
| 4,138,054 A | 2/1979 | Spencer | 229/23 BT |
| 4,140,889 A | 2/1979 | Mason et al. | 219/733 |
| 4,154,860 A | 5/1979 | Daswick | |
| 4,156,806 A | 5/1979 | Teich et al. | 219/10.55 E |
| 4,164,174 A | 8/1979 | Wallsten | 99/415 |
| 4,171,605 A | 10/1979 | Putnam, Jr. et al. | 53/552 |
| 4,184,061 A | 1/1980 | Suzuki et al. | 219/10.55 E |
| 4,186,217 A | 1/1980 | Tchack | |
| 4,190,757 A | 2/1980 | Turpin et al. | 219/10.55 E |
| 4,196,331 A | 4/1980 | Leveckis et al. | 219/10.55 E |
| D255,751 S | 7/1980 | Daenen | D7/667 |

(56) References Cited

U.S. PATENT DOCUMENTS

| | | | | |
|---|---|---|---|---|
| 4,219,573 | A | 8/1980 | Borek | 426/107 |
| 4,228,945 | A | 10/1980 | Wysocki | |
| 4,230,767 | A | 10/1980 | Isaka et al. | 428/349 |
| 4,230,924 | A | 10/1980 | Brastad et al. | 219/10.55 E |
| 4,233,325 | A | 11/1980 | Slangan et al. | |
| 4,241,563 | A | 12/1980 | Müller et al. | 53/511 |
| 4,242,378 | A | 12/1980 | Arai | 427/264 |
| 4,258,086 | A | 3/1981 | Beall | 219/10.43 |
| 4,264,668 | A | 4/1981 | Balla | 428/195 |
| 4,267,420 | A | 5/1981 | Brastad | 219/10.55 E |
| 4,279,933 | A | 7/1981 | Austin et al. | 426/124 |
| 4,280,032 | A | 7/1981 | Levinson | |
| 4,283,427 | A | 8/1981 | Winters et al. | 426/107 |
| 4,291,520 | A | 9/1981 | Prince et al. | 53/551 |
| 4,292,332 | A | 9/1981 | McHam | 426/111 |
| 4,304,352 | A | 12/1981 | Humphries | 229/31 R |
| 4,306,133 | A | 12/1981 | Levinson | |
| 4,314,650 | A * | 2/1982 | Cillario | 220/23.83 |
| 4,316,070 | A | 2/1982 | Prosise et al. | 219/10.55 E |
| 4,317,017 | A | 2/1982 | Bowen | |
| 4,324,088 | A | 4/1982 | Yamashita et al. | 53/527 |
| 4,328,254 | A | 5/1982 | Waldburger | |
| 4,335,291 | A | 6/1982 | Ishino et al. | 219/10.55 E |
| 4,340,138 | A | 7/1982 | Bernhardt | 206/216 |
| 4,345,133 | A | 8/1982 | Cherney et al. | 219/10.55 E |
| 4,348,421 | A | 9/1982 | Sakakibara et al. | |
| 4,351,997 | A | 9/1982 | Mattisson et al. | |
| 4,355,757 | A | 10/1982 | Roccaforte | 229/33 |
| 4,373,511 | A | 2/1983 | Miles et al. | 126/369 |
| 4,377,493 | A | 3/1983 | Boylan et al. | |
| 4,389,438 | A | 6/1983 | Ohtsuki et al. | 428/35 |
| 4,390,555 | A | 6/1983 | Levinson | |
| 4,398,994 | A | 8/1983 | Beckett | 156/659.1 |
| 4,416,906 | A | 11/1983 | Watkins | |
| 4,425,368 | A | 1/1984 | Watkins | |
| 4,439,656 | A | 3/1984 | Peleg | |
| 4,453,665 | A | 6/1984 | Roccaforte et al. | 229/41 B |
| 4,461,031 | A | 7/1984 | Blamer | 383/123 |
| 4,477,705 | A | 10/1984 | Danley et al. | |
| 4,478,349 | A | 10/1984 | Haverland et al. | 220/573.4 |
| 4,481,392 | A | 11/1984 | Nibbe et al. | |
| 4,486,640 | A | 12/1984 | Bowen et al. | |
| 4,493,685 | A | 1/1985 | Blamer | 493/235 |
| 4,496,815 | A | 1/1985 | Jorgensen | |
| 4,517,045 | A | 5/1985 | Beckett | 156/345 |
| 4,518,651 | A | 5/1985 | Wolfe, Jr. | 428/308.8 |
| 4,529,089 | A | 7/1985 | Gasbarra et al. | 206/525 |
| 4,532,397 | A | 7/1985 | McClelland | |
| D280,058 | S | 8/1985 | Carlson | D7/629 |
| 4,535,889 | A | 8/1985 | Terauds | 206/527 |
| 4,552,614 | A | 11/1985 | Beckett | 156/640 |
| 4,553,010 | A | 11/1985 | Bohrer et al. | 219/10.55 E |
| 4,571,337 | A | 2/1986 | Cage et al. | 426/107 |
| 4,574,776 | A * | 3/1986 | Hidle | 126/369 |
| 4,581,989 | A | 4/1986 | Swartley | 99/346 |
| 4,584,202 | A | 4/1986 | Roccaforte | 426/111 |
| 4,586,649 | A | 5/1986 | Webinger | 229/114 |
| 4,610,755 | A | 9/1986 | Beckett | 156/634 |
| 4,612,431 | A | 9/1986 | Brown et al. | 219/10.55 E |
| 4,626,352 | A | 12/1986 | Massey et al. | 210/469 |
| 4,634,003 | A * | 1/1987 | Ueda et al. | 206/221 |
| 4,640,838 | A | 2/1987 | Isakson et al. | 426/107 |
| 4,641,005 | A | 2/1987 | Seiferth | 219/10.55 E |
| 4,648,549 | A | 3/1987 | Trutna | 229/149 |
| 4,657,141 | A | 4/1987 | Sorensen | 206/519 |
| 4,661,671 | A | 4/1987 | Maroszek | 219/10.55 E |
| 4,661,672 | A | 4/1987 | Nakanaga | |
| 4,676,857 | A * | 6/1987 | Scharr et al. | 156/233 |
| 4,677,905 | A | 7/1987 | Johnson | 99/413 |
| 4,678,882 | A | 7/1987 | Bohrer et al. | 219/10.55 E |
| D291,522 | S | 8/1987 | Daenen et al. | D7/667 |
| 4,685,997 | A | 8/1987 | Beckett | 156/629 |
| 4,697,703 | A | 10/1987 | Will | 206/438 |
| 4,701,585 | A | 10/1987 | Stewart | 219/10.55 E |
| 4,703,148 | A | 10/1987 | Mikulski et al. | |
| 4,703,149 | A | 10/1987 | Sugisawa et al. | |
| 4,705,927 | A | 11/1987 | Levendusky et al. | 219/10.55 E |
| 4,713,510 | A | 12/1987 | Quick et al. | 219/10.55 E |
| 4,714,012 | A | 12/1987 | Hernandez | 99/444 |
| 4,727,706 | A | 3/1988 | Beer | 53/434 |
| 4,734,288 | A | 3/1988 | Engstrom et al. | 426/107 |
| 4,738,882 | A | 4/1988 | Rayford et al. | 428/35 |
| 4,739,698 | A | 4/1988 | Allaire | 99/410 |
| 4,739,898 | A | 4/1988 | Brown | 220/203.21 |
| 4,745,249 | A | 5/1988 | Daniels | |
| 4,777,053 | A | 10/1988 | Tobelmann et al. | |
| 4,794,005 | A | 12/1988 | Swiontek | |
| 4,797,010 | A | 1/1989 | Coelho | 383/109 |
| 4,803,088 | A | 2/1989 | Yamamoto et al. | |
| 4,804,582 | A | 2/1989 | Noding et al. | 428/332 |
| 4,806,718 | A | 2/1989 | Seaborne et al. | 219/10.55 E |
| 4,808,780 | A | 2/1989 | Seaborne | 219/10.55 E |
| 4,810,845 | A | 3/1989 | Seaborne | 219/10.55 E |
| 4,818,831 | A | 4/1989 | Seaborne | 219/10.55 E |
| 4,825,025 | A | 4/1989 | Seiferth | 219/10.55 E |
| 4,842,876 | A | 6/1989 | Anderson et al. | |
| 4,846,350 | A | 7/1989 | Sorensen | 206/520 |
| 4,848,579 | A | 7/1989 | Barnes et al. | |
| 4,851,246 | A | 7/1989 | Maxwell et al. | 426/107 |
| 4,853,505 | A | 8/1989 | Sorenson | |
| 4,853,509 | A | 8/1989 | Murakami | |
| 4,864,089 | A | 9/1989 | Tighe et al. | 219/10.55 E |
| 4,864,090 | A | 9/1989 | Maxwell et al. | 219/10.55 E |
| 4,870,233 | A | 9/1989 | McDonald et al. | |
| 4,873,919 | A | 10/1989 | Janssen | |
| 4,883,936 | A | 11/1989 | Maynard et al. | 219/10.55 E |
| 4,892,744 | A | 1/1990 | Ylvisaker | 426/111 |
| 4,896,009 | A | 1/1990 | Pawlowski | 219/10.55 E |
| 4,899,925 | A | 2/1990 | Bowden et al. | |
| 4,904,488 | A | 2/1990 | LaBaw et al. | 426/107 |
| 4,914,266 | A | 4/1990 | Parks et al. | 219/10.55 E |
| 4,915,216 | A | 4/1990 | Magers | 206/520 |
| 4,915,780 | A | 4/1990 | Beckett | 156/661.1 |
| 4,920,251 | A | 4/1990 | Whitenack et al. | |
| 4,922,079 | A | 5/1990 | Bowen et al. | |
| 4,923,704 | A | 5/1990 | Levinson | 422/310 |
| 4,924,048 | A | 5/1990 | Bunce et al. | |
| 4,935,592 | A | 6/1990 | Oppenheimer | |
| 4,939,332 | A | 7/1990 | Hahn | |
| 4,943,456 | A | 7/1990 | Pollart et al. | 428/34.3 |
| 4,948,932 | A | 8/1990 | Clough | 219/10.55 E |
| 4,952,765 | A | 8/1990 | Toyosawa | |
| 4,959,516 | A | 9/1990 | Tighe et al. | 219/10.55 E |
| 4,960,598 | A | 10/1990 | Swiontek | |
| 4,961,944 | A | 10/1990 | Matoba et al. | |
| 4,963,708 | A | 10/1990 | Kearns et al. | |
| D312,189 | S | 11/1990 | Noel | |
| 4,973,502 | A * | 11/1990 | Holzmuller et al. | 428/35.8 |
| 4,973,810 | A | 11/1990 | Brauner | 219/10.55 E |
| 4,982,064 | A | 1/1991 | Hartman et al. | 219/10.55 E |
| 4,987,280 | A | 1/1991 | Kanafani et al. | |
| 4,990,349 | A | 2/1991 | Chawan et al. | |
| 4,992,638 | A | 2/1991 | Hewitt et al. | |
| 5,011,299 | A | 4/1991 | Black, Jr. et al. | 383/126 |
| 5,025,715 | A | 6/1991 | Sir | |
| 5,026,958 | A | 6/1991 | Palacios | |
| 5,035,800 | A | 7/1991 | Kopach | 210/469 |
| 5,038,009 | A | 8/1991 | Babbitt | 219/10.55 E |
| 5,039,001 | A | 8/1991 | Kinigakis et al. | 229/120 |
| 5,041,295 | A | 8/1991 | Perry et al. | |
| 5,044,777 | A | 9/1991 | Watkins et al. | 383/100 |
| 5,050,791 | A | 9/1991 | Bowden et al. | |
| 5,052,369 | A | 10/1991 | Johnson | |
| 5,057,331 | A | 10/1991 | Levinson | |
| D321,302 | S | 11/1991 | Zimmerman | |
| 5,063,072 | A | 11/1991 | Gillmore et al. | |
| 5,075,526 | A | 12/1991 | Sklenak et al. | |
| 5,077,066 | A | 12/1991 | Mattson et al. | |
| 5,081,330 | A | 1/1992 | Brandberg et al. | 219/10.55 E |
| 5,094,865 | A | 3/1992 | Levinson | |
| 5,095,186 | A | 3/1992 | Russell et al. | 219/10.55 E |
| 5,106,635 | A | 4/1992 | McCutchan et al. | |
| 5,107,087 | A | 4/1992 | Yamada et al. | |
| 5,108,768 | A | 4/1992 | So | |

(56) References Cited

U.S. PATENT DOCUMENTS

| | | | |
|---|---|---|---|
| 5,153,402 A | 10/1992 | Quick et al. | 219/10.55 E |
| 5,176,284 A | 1/1993 | Sorensen | |
| 5,189,947 A | 3/1993 | Yim | 426/109 |
| 5,190,777 A | 3/1993 | Anderson et al. | |
| 5,195,829 A | 3/1993 | Watkins et al. | 383/100 |
| 5,200,590 A | 4/1993 | Bowen et al. | 219/10.55 E |
| D335,445 S | 5/1993 | Detert et al. | D9/761 |
| D335,821 S | 5/1993 | Detert et al. | D9/761 |
| D336,242 S | 6/1993 | Detert et al. | D9/761 |
| 5,223,291 A * | 6/1993 | Levinson et al. | 426/241 |
| 5,230,914 A | 7/1993 | Akervik | |
| 5,241,149 A | 8/1993 | Watanabe et al. | |
| D341,990 S | 12/1993 | Yim | |
| 5,294,765 A | 3/1994 | Archibald et al. | 219/727 |
| 5,298,708 A | 3/1994 | Babu et al. | 219/728 |
| 5,300,747 A | 4/1994 | Simon | |
| 5,315,083 A | 5/1994 | Green | |
| 5,342,634 A * | 8/1994 | Murata et al. | 426/113 |
| 5,363,750 A * | 11/1994 | Miller et al. | 99/426 |
| D353,303 S | 12/1994 | Davis | |
| 5,370,042 A | 12/1994 | Tolchin et al. | |
| 5,423,453 A | 6/1995 | Fritz | |
| 5,520,301 A | 5/1996 | Sohn | 220/265 |
| D370,598 S | 6/1996 | Koch | |
| D371,963 S | 7/1996 | Ahern, Jr. | |
| 5,540,381 A | 7/1996 | Davis | 229/103.2 |
| 5,558,798 A | 9/1996 | Tsai | |
| D376,512 S | 12/1996 | Klemme | D7/538 |
| 5,588,587 A | 12/1996 | Stier et al. | |
| D378,565 S | 3/1997 | Cousins | D7/667 |
| D378,566 S | 3/1997 | Cousins | D7/667 |
| 5,632,403 A | 5/1997 | Deng | |
| 5,645,300 A | 7/1997 | Hill | |
| 5,645,762 A | 7/1997 | Cook et al. | |
| 5,650,084 A | 7/1997 | Bley | 219/727 |
| 5,662,026 A | 9/1997 | Prakasa | |
| D384,555 S | 10/1997 | Bradley | |
| 5,674,546 A | 10/1997 | Barnes et al. | |
| D386,042 S | 11/1997 | Miller | |
| 5,690,853 A | 11/1997 | Jackson et al. | 219/727 |
| 5,695,801 A | 12/1997 | Oh | |
| 5,698,306 A | 12/1997 | Prosise et al. | |
| 5,704,485 A | 1/1998 | Cautereels et al. | 206/546 |
| 5,718,933 A | 2/1998 | Fultz | 426/115 |
| D391,440 S | 3/1998 | Cousins | D7/360 |
| 5,726,426 A | 3/1998 | Davis et al. | |
| 5,741,534 A | 4/1998 | Chung | |
| 5,747,086 A | 5/1998 | Bows et al. | |
| 5,753,895 A | 5/1998 | Olson et al. | 219/727 |
| 5,770,840 A | 6/1998 | Lorence | |
| 5,807,597 A | 9/1998 | Barnes et al. | |
| 5,826,494 A | 10/1998 | Wang | |
| D405,561 S | 2/1999 | Willinger et al. | D30/129 |
| 5,866,041 A | 2/1999 | Svarz et al. | |
| 5,869,120 A | 2/1999 | Blazevich | 423/132 |
| 5,871,790 A | 2/1999 | Monier et al. | 426/107 |
| 5,876,811 A | 3/1999 | Blackwell et al. | |
| 5,900,264 A | 5/1999 | Gics | |
| 5,913,966 A | 6/1999 | Arnone et al. | 99/413 |
| 5,916,470 A | 6/1999 | Besser et al. | |
| 5,916,620 A | 6/1999 | Oh | |
| 5,925,281 A | 7/1999 | Levinson | |
| 5,928,554 A | 7/1999 | Olson et al. | 219/727 |
| 5,931,333 A * | 8/1999 | Woodnorth et al. | 220/573.4 |
| 5,961,872 A | 10/1999 | Simon et al. | |
| 5,970,858 A | 10/1999 | Boehm et al. | 99/446 |
| 5,974,953 A | 11/1999 | Messerli | 99/340 |
| 5,986,248 A | 11/1999 | Matsuno et al. | 219/727 |
| 5,988,045 A * | 11/1999 | Housley | 99/339 |
| 5,988,050 A | 11/1999 | Foster, Jr. | 99/467 |
| D418,017 S | 12/1999 | Henry | |
| D419,371 S | 1/2000 | Haley | D7/392.1 |
| 6,018,157 A | 1/2000 | Craft | |
| 6,042,856 A * | 3/2000 | Sagan et al. | 426/87 |
| D422,176 S | 4/2000 | Laib | |
| 6,049,072 A | 4/2000 | Olson et al. | 219/727 |
| 6,085,930 A | 7/2000 | Curtis | 220/371 |
| 6,097,017 A | 8/2000 | Pickford | |
| 6,103,291 A | 8/2000 | Tapia | 426/523 |
| 6,106,882 A | 8/2000 | Oh et al. | |
| D432,414 S | 10/2000 | Simpson et al. | D9/711 |
| D432,914 S | 10/2000 | Hayes et al. | |
| 6,126,976 A | 10/2000 | Hasse, Jr. et al. | |
| 6,136,355 A | 10/2000 | Fukuyama | |
| D433,884 S | 11/2000 | Fujimoto | D7/667 |
| 6,147,337 A | 11/2000 | Besser | |
| 6,150,646 A | 11/2000 | Lai et al. | |
| 6,168,044 B1 | 1/2001 | Zettle et al. | |
| 6,175,105 B1 | 1/2001 | Rubbright et al. | |
| 6,180,148 B1 | 1/2001 | Yajima | |
| 6,180,150 B1 | 1/2001 | Schäfer | |
| 6,183,789 B1 | 2/2001 | Nilsson et al. | |
| 6,187,354 B1 | 2/2001 | Hopkins | |
| 6,192,792 B1 | 2/2001 | Gremillion | |
| 6,196,406 B1 | 3/2001 | Ennis | |
| 6,217,918 B1 | 4/2001 | Oh et al. | |
| D441,597 S | 5/2001 | Wyche | |
| D442,425 S | 5/2001 | Wyche | |
| 6,229,131 B1 | 5/2001 | Koochaki | |
| 6,230,919 B1 | 5/2001 | Guillin | 220/315 |
| D445,633 S | 7/2001 | Bradley | |
| D449,102 S | 10/2001 | Shin | D23/366 |
| D449,495 S | 10/2001 | Tucker et al. | |
| 6,309,684 B2 * | 10/2001 | Hopkins, Sr. | 426/234 |
| 6,365,206 B1 | 4/2002 | Yanai et al. | |
| 6,394,337 B1 | 5/2002 | Ross et al. | 229/103.2 |
| 6,396,036 B1 | 5/2002 | Hanson | 219/727 |
| 6,422,453 B1 | 7/2002 | Wang | |
| 6,455,084 B2 | 9/2002 | Johns | |
| 6,463,844 B1 | 10/2002 | Wang et al. | |
| 6,467,399 B1 | 10/2002 | Boutte | |
| 6,486,455 B1 | 11/2002 | Merabet | |
| D466,762 S | 12/2002 | Cote et al. | D7/545 |
| 6,509,047 B2 | 1/2003 | Edomwonyi | |
| D470,768 S | 2/2003 | Melhede | D9/428 |
| 6,546,849 B1 | 4/2003 | Shimazaki | |
| 6,559,431 B2 | 5/2003 | Hopkins | |
| 6,565,910 B1 | 5/2003 | Schell et al. | 426/589 |
| D477,187 S | 7/2003 | McCallister et al. | |
| 6,608,292 B1 | 8/2003 | Barnes | |
| 6,612,482 B2 | 9/2003 | Ross | 229/103.2 |
| 6,645,539 B2 | 11/2003 | Bukowski et al. | |
| D483,616 S | 12/2003 | Thonis | |
| D485,473 S | 1/2004 | Dais et al. | D7/629 |
| 6,727,484 B2 | 4/2004 | Policappelli | |
| 6,803,551 B2 | 10/2004 | Kim et al. | 219/731 |
| D497,744 S | 11/2004 | Smith et al. | D7/543 |
| 6,818,873 B2 | 11/2004 | Savage et al. | |
| 6,840,159 B1 | 1/2005 | Li | 99/337 |
| D502,847 S | 3/2005 | Leonori | D7/667 |
| 6,868,980 B2 | 3/2005 | Schultz et al. | 220/367.1 |
| D505,048 S | 5/2005 | Cornfield | D7/409 |
| D505,590 S | 5/2005 | Greiner et al. | D7/409 |
| D508,822 S | 8/2005 | Smith et al. | |
| D513,942 S | 1/2006 | De Groote | D7/665 |
| 7,008,214 B2 | 3/2006 | Faddi | 425/382 R |
| 7,022,359 B2 | 4/2006 | Montserrate Gibernau | |
| 7,025,213 B2 * | 4/2006 | Chen | 210/474 |
| D521,380 S | 5/2006 | Jackson et al. | |
| 7,038,181 B2 | 5/2006 | Edmark | |
| 7,045,190 B2 | 5/2006 | Inagaki et al. | |
| D526,840 S | 8/2006 | Carlson | D7/392.1 |
| 7,090,090 B2 | 8/2006 | Ohyama | |
| D529,797 S | 10/2006 | Wilcox et al. | D9/428 |
| D543,796 S | 6/2007 | Lion et al. | D7/667 |
| D552,433 S | 10/2007 | Stewart | D7/667 |
| D557,982 S | 12/2007 | Ablo et al. | D7/409 |
| D558,536 S | 1/2008 | Curtin | D7/667 |
| D558,602 S | 1/2008 | Kissner et al. | D9/711 |
| D563,157 S | 3/2008 | Bouveret et al. | |
| D564,287 S | 3/2008 | Bouveret et al. | |
| D564,307 S | 3/2008 | Repp | D7/667 |
| D571,656 S | 6/2008 | Maslowski | D9/425 |
| D577,295 S | 9/2008 | Miller et al. | D9/711 |

(56) References Cited

U.S. PATENT DOCUMENTS

| | | | |
|---|---|---|---|
| D582,201 S | 12/2008 | Kellermann | |
| D582,791 S | 12/2008 | Elmerhaus | D9/721 |
| 7,468,498 B2 | 12/2008 | Tuszkiewicz et al. | 219/725 |
| D584,111 S | 1/2009 | Eide et al. | D7/667 |
| D584,145 S | 1/2009 | Young | |
| D590,663 S | 4/2009 | Simon et al. | |
| D591,591 S | 5/2009 | Moecks et al. | |
| D592,948 S | 5/2009 | Mayer | D9/418 |
| D593,369 S | 6/2009 | Green et al. | D7/602 |
| D594,328 S | 6/2009 | Shapiro et al. | D9/435 |
| D598,717 S | 8/2009 | Jalet | D7/667 |
| D607,095 S | 12/2009 | LeMay et al. | D23/366 |
| D610,903 S | 3/2010 | Shapiro et al. | D9/428 |
| D611,300 S | 3/2010 | Chen et al. | |
| D612,196 S | 3/2010 | Furlong | D7/392.1 |
| D613,131 S | 4/2010 | Chen et al. | D7/667 |
| D630,061 S | 1/2011 | Kellermann | |
| D630,507 S | 1/2011 | Short et al. | D9/427 |
| D630,940 S | 1/2011 | Shapiro et al. | D9/428 |
| D632,561 S | 2/2011 | Short et al. | D9/427 |
| D633,810 S | 3/2011 | Jenkins | D9/721 |
| 7,977,612 B2 | 7/2011 | Levy et al. | 219/729 |
| 8,302,528 B2 * | 11/2012 | Pawlick et al. | 99/448 |
| 2001/0035402 A1 | 11/2001 | Barrow | 219/432 |
| 2001/0043971 A1 | 11/2001 | Johns | |
| 2001/0050002 A1 * | 12/2001 | Bonanno | 99/275 |
| 2002/0096450 A1 | 7/2002 | Garst | 206/516 |
| 2002/0110622 A1 | 8/2002 | Lloyd et al. | 426/115 |
| 2003/0003200 A1 | 1/2003 | Bukowski et al. | |
| 2003/0068411 A1 | 4/2003 | McCallister et al. | 426/107 |
| 2003/0167932 A1 | 9/2003 | Chen | |
| 2003/0213718 A1 | 11/2003 | Ducharme et al. | |
| 2004/0058038 A1 | 3/2004 | Lee | |
| 2004/0107637 A1 | 6/2004 | Sieverding | 47/83 |
| 2004/0121049 A1 | 6/2004 | Ebner et al. | |
| 2004/0164075 A1 | 8/2004 | Henze et al. | |
| 2004/0216620 A1 | 11/2004 | Quiggins et al. | |
| 2004/0238438 A1 * | 12/2004 | Chen | 210/474 |
| 2005/0034611 A1 | 2/2005 | McLemore | |
| 2005/0040161 A1 | 2/2005 | Lin et al. | |
| 2005/0051549 A1 | 3/2005 | Nelson | 220/23.83 |
| 2005/0069602 A1 | 3/2005 | Faddi | 425/208 |
| 2005/0079250 A1 | 4/2005 | Mao et al. | 426/113 |
| 2005/0079252 A1 | 4/2005 | Kendig et al. | 426/125 |
| 2005/0082305 A1 | 4/2005 | Dais et al. | |
| 2005/0092762 A1 | 5/2005 | Murat et al. | |
| 2005/0109772 A1 | 5/2005 | Thorpe et al. | |
| 2005/0112243 A1 | 5/2005 | Bellmann | 426/106 |
| 2005/0115417 A1 | 6/2005 | Murat et al. | 99/413 |
| 2005/0208182 A1 | 9/2005 | Gilbert et al. | 426/87 |
| 2005/0220939 A1 | 10/2005 | Morrow | 426/86 |
| 2005/0229793 A1 * | 10/2005 | Wengrovsky | 99/483 |
| 2005/0256060 A1 | 11/2005 | Hilgers et al. | 514/25 |
| 2005/0271776 A1 | 12/2005 | Siegel | 426/138 |
| 2005/0281921 A1 | 12/2005 | Langston et al. | |
| 2006/0013929 A1 | 1/2006 | Morris et al. | |
| 2006/0088678 A1 | 4/2006 | Berrier et al. | |
| 2006/0110498 A1 | 5/2006 | Dellinger et al. | |
| 2006/0118552 A1 | 6/2006 | Tiefenback | |
| 2006/0121168 A1 | 6/2006 | Flaherty et al. | |
| 2006/0151339 A1 | 7/2006 | Bradley et al. | |
| 2006/0236593 A1 | 10/2006 | Cap | |
| 2006/0260598 A1 | 11/2006 | Bjork et al. | |
| 2006/0289522 A1 | 12/2006 | Middleton et al. | 219/730 |
| 2007/0029314 A1 | 2/2007 | Rodgers et al. | |
| 2007/0059406 A1 | 3/2007 | Shahsavarani | 426/106 |
| 2007/0092610 A1 * | 4/2007 | Mize | 426/120 |
| 2007/0116806 A1 | 5/2007 | Parsons | |
| 2007/0116807 A1 | 5/2007 | Parsons | |
| 2007/0131679 A1 | 6/2007 | Edwards et al. | |
| 2007/0181008 A1 | 8/2007 | Pawlick et al. | |
| 2007/0251874 A1 | 11/2007 | Stewart | 210/232 |
| 2008/0069485 A1 | 3/2008 | France et al. | |
| 2008/0138473 A1 | 6/2008 | Pawlick et al. | |
| 2008/0178744 A1 | 7/2008 | Hill | 99/323.5 |
| 2008/0210686 A1 | 9/2008 | Shapiro et al. | |
| 2009/0022858 A1 | 1/2009 | Pawlick | |
| 2009/0035433 A1 | 2/2009 | France et al. | |
| 2009/0078125 A1 | 3/2009 | Pawlick et al. | |
| 2009/0142455 A1 | 6/2009 | Parsons | 426/120 |
| 2010/0015293 A1 | 1/2010 | Shapiro | |

FOREIGN PATENT DOCUMENTS

| | | |
|---|---|---|
| EP | 0326105 A1 | 8/1989 |
| EP | 0 449 643 A1 | 10/1991 |
| EP | 1 245 504 | 10/2002 |
| EP | 1 352 841 A1 | 10/2003 |
| EP | 1 352 848 | 10/2003 |
| EP | 1 514 804 A1 | 3/2005 |
| EP | 1 464 262 B1 | 7/2005 |
| EP | 1 612 150 A1 | 1/2006 |
| EP | 1 749 757 A2 | 2/2007 |
| FR | 2 631 315 A3 | 11/1989 |
| FR | 2 774 262 A1 | 8/1999 |
| FR | 2 846 196 A1 | 4/2004 |
| FR | 2 860 213 | 4/2005 |
| FR | 2 929 491 | 10/2009 |
| GB | 1 560 488 | 2/1980 |
| GB | 2 218 962 A | 11/1989 |
| GB | 2 295 371 A | 5/1996 |
| GB | 2 308 465 A | 6/1997 |
| GB | 2340823 | 3/2000 |
| JP | 2-109882 | 4/1990 |
| JP | 4367476 A | 12/1992 |
| JP | 06293366 | 10/1994 |
| JP | 09051767 | 2/1997 |
| JP | 09051767 A * | 2/1997 |
| JP | 10094370 A | 4/1998 |
| JP | 10-129742 | 5/1998 |
| JP | 11113511 | 4/1999 |
| JP | 2001348074 A | 12/2001 |
| JP | 2005059863 A | 3/2005 |
| JP | A-2005-312923 | 11/2005 |
| JP | A-2006-34645 | 2/2006 |
| JP | 2010-189031 | 9/2010 |
| MX | 01011879 A | 6/2002 |
| SU | 1149999 A | 4/1985 |
| WO | WO 86/00275 | 1/1986 |
| WO | WO 96/07604 | 3/1996 |
| WO | WO 98/33399 | 8/1998 |
| WO | WO 99/59897 | 11/1999 |
| WO | WO 02/051716 | 7/2002 |
| WO | WO 03/086882 A1 | 10/2003 |
| WO | WO 2004/045970 A1 | 6/2004 |
| WO | WO 2006/098950 A2 | 9/2006 |
| WO | WO 2006/128156 A2 | 11/2006 |
| WO | WO 2006/136825 A1 | 12/2006 |
| WO | WO 2007/003864 A2 | 1/2007 |
| WO | WO 2008/109448 A2 | 9/2008 |
| WO | WO 2008/109448 A3 | 9/2008 |
| WO | WO 2009/097030 A1 | 8/2009 |
| WO | WO 2009/136038 A1 | 11/2009 |

OTHER PUBLICATIONS

"Cafe Steamers," HealthyChoice.com, http://www.healthychoice.com/products/rneals/cafe_steamers.jsp (Retrieved Aug. 2007).

"Ziploc® Containers With Snap'n'Seal Lids: Designed With You in Mind," brochure found at http://www.ziploc.com/food-storage-containers/, 2 pages (Retrieved Nov. 14, 2005).

"Ziploc® Containers With Snap'n'Seal Lids: Storage Made Simpler!," brochure found at http://www.ziploc.com/new_containers.html, 1 page (Retrieved Nov. 14, 2005).

Anchor Hocking '70 Catalog, p. 83, baking dishes at #4, 5 and 6 (Oct. 1970).

France, "Steam Cooking Apparatus," U.S. Appl. No. 60/728,468, filed Oct. 20, 2005.

McCallister, "Microwaveable Pasta Product," U.S. Appl. No. 09/965,300, filed Sep. 28, 2001.

Photographs of a food tray available from Inter Frost GmbH at a trade show in Germany, Oct. 2005.

(56) References Cited

OTHER PUBLICATIONS

U.S. Appl. No. 29/346,147, filed Oct. 27, 2009 entitled "Container Assembly".
U.S. Appl. No. 29/346,148, filed Oct. 27, 2009 entitled Container Basket.
Priority document in U.S. Appl. No. 12/012,403, filed Feb. 2, 2008 (filed in Int'l Application No. PCT/US2008/080874 on Nov. 3, 2008).
http://www.unclebens.de/produkte/heiss_auf_reis/heiss_auf_reis_uebersicht.aspx, Mars Inc., 2006, 1 pg.
http://www.pastanmoresale.com, site accessed Jun. 15, 2010, 2 pgs. (now being sold at http://pastaboat.com).
Machine translation FR 2774262, Etimble et al., Aug. 1999, 9 pgs.
Docket Sheet for Green v. ConAgra Foods, Case # 8:08-cv-00200, 11 pgs.
Green v. ConAgra Foods, Case #8:08-cv-00200, Complaint for Patent Infringement and Injunctive Relief, filed May 5, 2008, 13 pgs.
Green v. ConAgra Foods, Case #8:08-cv-00200, Answer, Affirmative Defenses and Counterclaims of Defendant ConAgra Foods, Inc., filed, May 5, 2008, 12 pgs.
Green v. ConAgra Foods, Case #8:08-cv-00200, Answer to Counterclaims, filed May 5, 2008, 2 pgs.
Green v. ConAgra Foods, Case #8:08-cv-00200, Joint Claim Construction Chart, filed Sep. 24, 2008, 3 pgs.
Green v. ConAgra Foods, Case #8:08-cv-00200, Plaintiffs Opening Brief on Claim Construction, filed Oct. 10, 2008, 27 pgs.
Green v. ConAgra Foods, Case #8:08-cv-00200, Index of Evidence in Support of ConAgra Foods, Inc.'s Opening Markman Brief, filed Oct. 10, 2008, 105 pgs.
Green v. ConAgra Foods, Case #8:08-cv-00200, Plaintiffs Responsive Brief on Claim Construction, filed Oct. 31, 2008, 16 pgs.
Green v. ConAgra Foods, Case #8:08-cv-00200, Defendant ConAgra Foods, Inc.'s Brief in Response to Plaintiffs Opening Brief on Claim Construction, filed Oct. 31, 2008, 17 pgs.
Green v. ConAgra Foods, Case #8:08-cv-00200, Memorandum and Order, filed Jan. 9, 2009, 14 pgs.
Green v. ConAgra Foods, Case #8:08-cv-00200, Transcript of Markman Hearing Proceedings Before the Honorable Lyle E. Strom, filed Jan. 15, 2009, 76 pgs.
Green v. ConAgra Foods, Case #8:08-cv-00200, Joint Stipulation of Dismissal with Prejudice, filed Feb. 2, 2009, 3 pgs.
Green v. ConAgra Foods, Case #8:08-cv-00200, Order, filed Feb. 3, 2009, 1 pg.
Green v. ConAgra Foods, Case #8:08-cv-00200, Report on the Determination of an Action Regarding Patent, filed Feb. 4, 2009, 2 pg.
Invitation to Pay Additional Fees with Partial International Search mailed Jun. 25, 2008.
International Search Report dated Aug. 20, 2008, Application No. PCT/US2008/055512.
International Search Report dated Oct. 20, 2008, Application No. PCT/US2008/071917.
U.S. Official Action Mailed Sep. 18, 2008 in U.S. Appl. No. 11/424,520.
U.S. Official Action Mailed Apr. 24, 2009 in U.S. Appl. No. 11/286,008.
U.S. Official Action Mailed Apr. 30, 2009 in U.S. Appl. No. 11/424,520.
U.S. Official Action Mailed Oct. 16, 2009 in U.S. Appl. No. 11/903,732.
U.S. Official Action Mailed Oct. 29, 2009 in U.S. Appl. No. 11/890,297.
U.S. Official Action Mailed Nov. 12, 2009 in U.S. Appl. No. 11/286,008.
U.S. Official Action Mailed Nov. 25, 2009 in U.S. Appl. No. 11/424,520.
U.S. Official Action Mailed Mar. 10, 2010 in U.S. Appl. No. 11/903,732.
U.S. Official Action Mailed Mar. 29, 2010 in U.S. Appl. No. 29/351,253.
U.S. Official Action Mailed Apr. 14, 2010 in U.S. Appl. No. 11/424,520.
U.S. Official Action Mailed May 21, 2010 in U.S. Appl. No. 11/286,008.
European Office Action mailed Jul. 15, 2010 in Application No. 08731136.1.
U.S. Official Action Mailed Dec. 11, 2008 in U.S. Appl. No. 11/286,008.
U.S. Official Action Mailed May 25, 2010 in U.S. Appl. No. 11/423,259.
U.S. Official Action Mailed Oct. 6, 2010 in U.S. Appl. No. 11/424,520.
U.S. Official Action Mailed Oct. 7, 2010 in U.S. Appl. No. 11/703,066.
U.S. Official Action Mailed Dec. 9, 2010 in U.S. Appl. No. 29/346,147.
U.S. Official Action Mailed Dec. 9, 2010 in U.S. Appl. No. 29/346,148.
U.S. Official Action Mailed Dec. 28, 2010 in U.S. Appl. No. 29/364,804.
U.S. Official Action Mailed Feb. 23, 2011 in U.S. Appl. No. 29/369,419.
U.S. Official Action Mailed Mar. 21, 2011 in U.S. Appl. No. 11/703,066.
U.S. Official Action Mailed Apr. 1, 2011 in U.S. Appl. No. 11/424,520.
U.S. Official Action Mailed Apr. 6, 2011 in U.S. Appl. No. 12/277,886.
U.S. Official Action Mailed Apr. 8, 2011 in U.S. Appl. No. 29/369,416.
U.S. Official Action Mailed Apr. 12, 2011 in U.S. Appl. No. 29/369,423.
Supp. International Search Report dated Mar. 15, 2011, Application No. PCT/CA2006/001894.
U.S. Official Action mailed May 2, 2012, in U.S. Appl. No. 11/903,732.
U.S. Official Action mailed May 2, 2012, in U.S. Appl. No. 12/040,641.
U.S. Official Action mailed Sep. 10, 2012, in U.S. Appl. No. 11/903,732.
U.S. Official Action mailed Sep. 24, 2012, in U.S. Appl. No. 12/471,114.
U.S. Official Action mailed Sep. 25, 2012, in U.S. Appl. No. 12/040,641.
Succinylated Monoglycerides; http://www.fao.org/ag/agn/jecfa-additives/specs/Monograph1/Additive-443.pdf; 1982; obtained Sep. 14, 2012.
U.S. Official Action mailed Mar. 26, 2012, in U.S. Appl. No. 11/424,520.
European Search Report dated Jan. 27, 2011, in Application No. 08832921.4-1261.
European Allowance dated Jul. 18, 2011, in Application No. 10163678.5-2308.
U.S. Official Action mailed Aug. 5, 2011, in U.S. Appl. No. 11/286,008.
U.S. Official Action mailed Aug. 9, 2011, in U.S. Appl. No. 11/903,732.
U.S. Official Action mailed Aug. 11, 2011, in U.S. Appl. No. 11/703,066.
U.S. Official Action mailed Aug. 19, 2011, in U.S. Appl. No. 11/424,520.
U.S. Official Action mailed Aug. 25, 2011, in U.S. Appl. No. 12/277,886.
U.S. Official Action mailed Nov. 7, 2011, in U.S. Appl. No. 11/890,297.
U.S. Official Action mailed Jan. 11, 2012, in U.S. Appl. No. 11/703,066.
Starmald Microwave Steamer Jun. 26, 2006, [on line], retrieved on Oct. 13, 2011. Retrieved from the Internet: URL:<http://www.flickr.com/photos/starmaid/5180282532/>.
Progressive International Mini Steamer (on line), Jul. 18, 2006. Retrieved from the Internet at the URL listed in the column immediately following this column.
http://www.google.com/search?q=microwave.steamer&hl=en&biw=1291&bih=1015&ea=X&si=0ZuXTiqGMKb10gGMyo

(56) References Cited

OTHER PUBLICATIONS

HWBA&ved=0CAxOpwUoBg&source=int&tbs=cdr%3A1%2O rd_min%3A%20cd_spacemax%3A8%2F2%2F2007&tbm32 spq=microwave+steamer&hi=en8sugexp=gsih&cp=12&gs_id=9& xhr=18q=microwave+mini+steamer&pf=p&sclient=psy-sb&blw-12918bih=1016&tbs-ing:1%2Codr%3A1%2Cod_max%3A8% 2F2%2F20068.

Mini Steamer—Progressive International / Starmaid vegetable steamer. [on line], retrieved Oct. 21, 2011, Retrieved from the Internet: URL:<http://www.campingcookwarepro.com/Progressive_International_Microwavable_Mini_Steamer>.

Tupperware India, Cook easy Microsteamer, The Hindu Business Line, [on line], Jul. 26, 2008. retrieved on Oct. 21, 2011. Retrieved from the Internet. URL:<http://www.thehindubusinessline.in/catalyst/2003/06/26/stories/2003062600070406.htm>.

Microwave mini steamer, Lunch in a Box, [on line] Feb. 12, 2007, retrieved on Oct. 13, 2011. Retrieved from the Internet: URL:<http://www.flickr.com/photo/24506652@N00/368209604/>.

Microwave steamer 2, Oct. 16, 2006, [on line]. Retrieved from the Internet: URL:<http://www.flickr.com/photos/momsinmind/271170248/>.

U.S. Official Action mailed Jan. 24, 2013, in U.S. Appl. No. 12/471,114.

Propylene Glycol Monostearate; *Hawley's Condensed Chemical Dictionary Thirteenth Edition*; 1997.

U.S. Notice of Allowance and Fees Due in U.S. Appl. No. 29/424,416.

U.S. Official Action mailed Jul. 3, 2013, in U.S. Appl. No. 11/286,008.

U.S. Official Action mailed Aug. 21, 2013, in U.S. Appl. No. 11/890,297.

U.S. Official Action Mailed Jan. 16, 2014, in U.S. Appl. No. 12/277,886.

U.S. Official Action Mailed Jan. 16, 2014, in U.S. Appl. No. 11/286,008.

U.S. Official Action Mailed Jan. 22, 2014, in U.S. Appl. No. 12/471,114.

U.S. Official Action Mailed Jan. 29, 2014, in U.S. Appl. No. 12/040,641.

U.S. Official Action mailed Oct. 3, 2013, in U.S. Appl. No. 11/703,066.

U.S. Official Action mailed Sep. 19, 2013, in U.S. Appl. No. 12/471,114.

International Search Report mailed Dec. 4, 2013 in Application No. PCT/US2013/044064.

U.S. Official Action Mailed Mar. 21, 2014, in U.S. Appl. No. 11/703,066.

U.S. Official Action Mailed Apr. 14, 2014, in U.S. Appl. No. 11/423,259.

U.S. Official Action Mailed Apr. 21, 2014, in U.S. Appl. No. 11/424,520.

U.S. Official Action Mailed Jun. 16, 2014, in U.S. Appl. No. 12/277,886.

U.S. Official Action Mailed Sep. 9, 2014, in U.S. Appl. No. 11/423,259.

U.S. Official Action Mailed Mar. 5, 2015, in U.S. Appl. No. 13/742,450.

* cited by examiner

STEAM COOKING APPARATUS

CROSS-REFERENCE TO RELATED APPLICATION

This application claim priority from Provisional Application Ser. No. 60/728,468 filed on Oct. 20, 2005, which is hereby incorporated in its entirety.

FIELD OF THE INVENTION

The present invention relates to an ovenable cooking apparatus. In particular, the present invention relates to an apparatus suitable for use in a conventional, convection, or microwave oven, for steam cooking food products.

BACKGROUND OF THE INVENTION

As contemporary society progresses, people spend less time preparing and consuming meals. Fast food provides one option for those who want their meal in a short time ready for consumption; however, many people no longer desire fast food or can not eat it, due to its lack of nutrition and in particular, its high calorie, salt, and fat content.

Prepared foods, such as those appearing in supermarkets, take-out establishments, and the like, while appearing to be home cooked, are typically expensive. Additionally, like fast food, these prepared foods lack nutritional value, and are usually high in calories, salt, and fat. Accordingly, both fast food and prepared foods do not appeal to health conscious consumers.

Health conscious consumers have found some suitability in frozen meals and prepackaged meals, such as those that can be heated in a microwave oven; however, these frozen meals typically mix together all of their contents. Accordingly, when cooked or reheated, some of the contents may be undercooked, while some of the contents may be overcooked. Similarly, room temperature prepackaged meals may suffer partial degradation and discoloration of the components while in storage, and when heated in a microwave oven, the components may also cook unevenly.

To address some of the problems of intermixed frozen meals, a food container for use in a microwave with an internal separator dividing the container into upper and lower compartments was developed. The upper compartment is configured for a food product and the lower for a water or water-containing medium. The separator is a thin perforated sheet that is designed to snap into place with evenly spaced internal lugs. When the food container is placed in the microwave and heated the steam created by the water medium passes through the separator to steam the product. The problem with this food container is that the separator is configured to latch into place for use with the container, thereby inhibiting the availability of the water-containing medium after the food product is steamed.

Therefore a need still exists for an ovenable cooking apparatus that facilitates steam cooking of a food product in microwave ovens and the like, separates the food product from the sauce or liquid used to steam the food product, and allows the consumer to easily access the steamed food product and sauce after cooking.

SUMMARY OF THE INVENTION

The present invention improves on the contemporary art by providing an ovenable steam cooking apparatus, typically for microwave ovens and the like, that has separate compartments for different foods or food components. These separate compartments are such that food components are kept separate during storage, prior to cooking or heating, (cooking and heating hereinafter, referred to collectively as "cooking", and all variations thereof), as well as during cooking. This arrangement prevents unwanted mixing of the food components. As a result, the food components in the second or upper compartment maintain their integrity and do not degrade or discolor as a result of having contacted the food components in the first or lower compartment. Accordingly, the invention is operable with sauces or liquids in one compartment, separate from components such as proteins and/or starches, in a separate compartment.

These separate compartments also facilitate cooking of the proteins and/or starches in a second or upper compartment with the steam generated by heating the sauce or liquid food component in the first or lower compartment. By separating the proteins and/or starches from the sauce, the food product remains crispier and develops a mouth feel similar to traditionally steamed proteins and/or starches. In addition, as the food components in each of the compartments cook simultaneously, they are ready for consumption in a shorter time than had the meal been prepared in a non-microwave oven, or the food components were prepared separately.

Additionally, the compartments are designed such after the product is cooked, the upper compartment can be easily removed from the lower compartment. As such, the consumer may eat the steamed starch and/or protein product, of the upper compartment, by itself or may choose to add the heated sauce, of the lower compartment, onto the steamed starch and/or protein.

The ovenable cooking apparatus includes upper and lower compartments for food components. These compartments are arranged such that the food component in the upper compartment is cooked by steaming. The steam is generated upon heating the food component in the lower compartment until at least a portion of the food component boils. The generated steam then enters the upper compartment through openings in the base and side walls of the upper compartment. Food components cooked by steam are typically healthier, and typically include, starches and proteins, such as rice, vegetables, shrimp, meat, and the like. Accordingly, the apparatus is suitable for storing and steam cooking healthy and nutritious meals that may be cooked in a microwave oven in a short time, as compared to preparing the same meal conventionally.

DETAILED DESCRIPTION

The present invention relates to an ovenable cooking or heating (cooking and heating, and variations thereof, collectively known as "cooking", as detailed above) apparatus, for use with conventional, convection, or microwave ovens. Alternatively, the ovenable cooking apparatus may be used with grills and other heating devices. The apparatus has separate compartments for different foods or food components, such that the separateness and integrity of each food type is maintained from processing (filling and packaging) through storage and cooking. In particular, the second or upper compartment is removably received by the first or lower compartment such that after the food product is heated, the compartments may be easily separated. The apparatus also includes a sheet of barrier material sealing the combined compartments and food products.

As the apparatus is heated, at least a portion of the first food component in the first or lower compartment boils producing steam. The steam rises into the second or upper compartment thereby steam cooking the second food component. The second or upper compartment includes a plurality of openings that allow the steam to pass from the first and lower compartment into the second or upper compartment. The sheet of barrier material ensures that the food product is cooked uniformly by preventing the steam from escaping the compartments or dissipating into the atmosphere during cooking. Although, the apparatus is designed such that the foods or food components in each of the compartments cook simultaneously, as the compartments are easily separated, the consumer may choose to consume the steamed second food product by itself or in combination with the first food component.

Throughout this document there are references to directions and positions. These directional and positional references are to the apparatus of the invention in typical orientations. The references include, for example, upper, lower, top, bottom, above, below, and are exemplary only. They are not limiting in any way, as they are for description and explanation purposes.

FIGS. 1A-3C show an apparatus 20 in accordance with an embodiment of the invention. The apparatus 20 is designed for holding separate food components to maintain the separateness and integrity of the components during storage and cooking. The food components may be combined after cooking by the user. Apparatus 20 may be of any general shape without departing from the scope of the invention. Suitable shapes include circular, oval, rectangular, square, among others. As shown in FIGS. 1A-3C, the apparatus 20 may be of circular shape. The apparatus 20 includes a container 22 and a basket 24, that are separate pieces, with the basket 24 constructed to be received by the container 22.

Figure 1A:
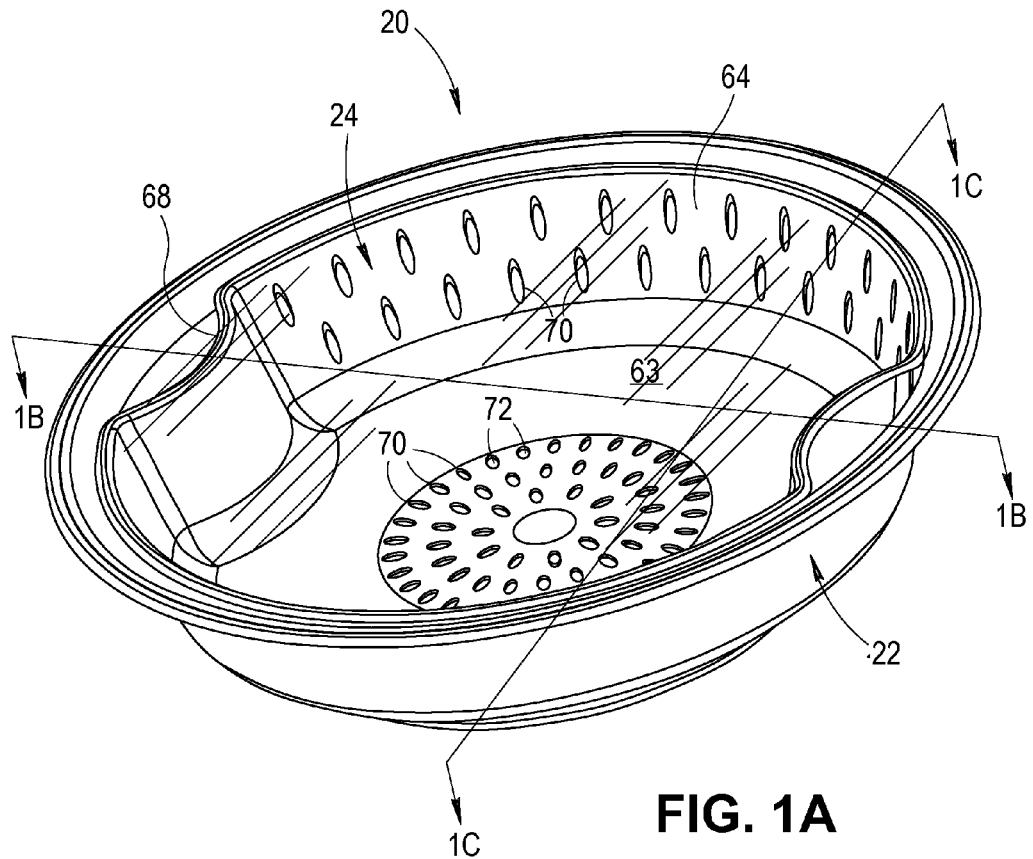
FIG. 1A is a perspective view of a cooking apparatus in accordance with a first embodiment of the present invention.
Figure 1B:
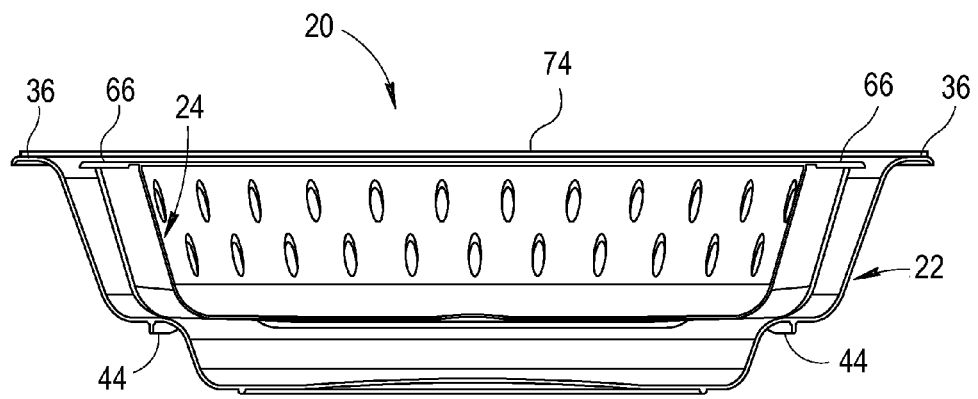
FIGS. 1B and 1C are side cross-sectional views of the cooking apparatus of FIG. 1A, taken along lines 1B-1B and 1C-1C, respectively.
Figure 1C:
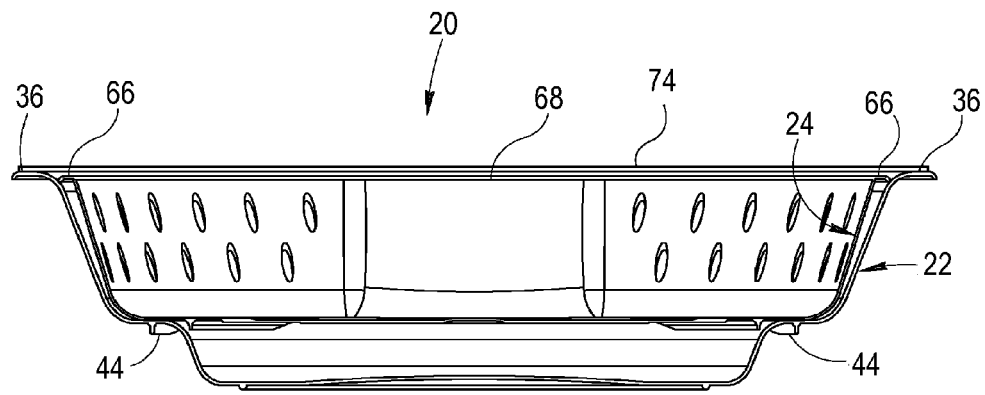

The container 22 holds a first food component, such as, liquids, gels, partially liquid or gelatinous mixtures, and mixtures thereof. Examples of the first food component include a sauce, gravy, water, and meat and/or vegetables in a sauce or gravy. The basket 24, is received and held by the container 22, and is in coaxial alignment with the container 22. The basket 24 typically holds a solid food component, such as starches and/or proteins, such as rice, grains, and pasta, vegetables, or other particulate foods, that are typically steam cooked. Accordingly, the basket 24 includes openings 70 in its base 63 and its sidewalls 64, that allow steam, generated by the cooking of the first component, to enter the basket 24, and cook the second food component. The openings 70 are also dimensioned to allow liquids, such as water and the like, generated in the upper compartment during cooking, to drain into the container 22. FIGS. 1A, 1B, and 1C further illustrate the sheet of barrier material 74.

Figure 2A:
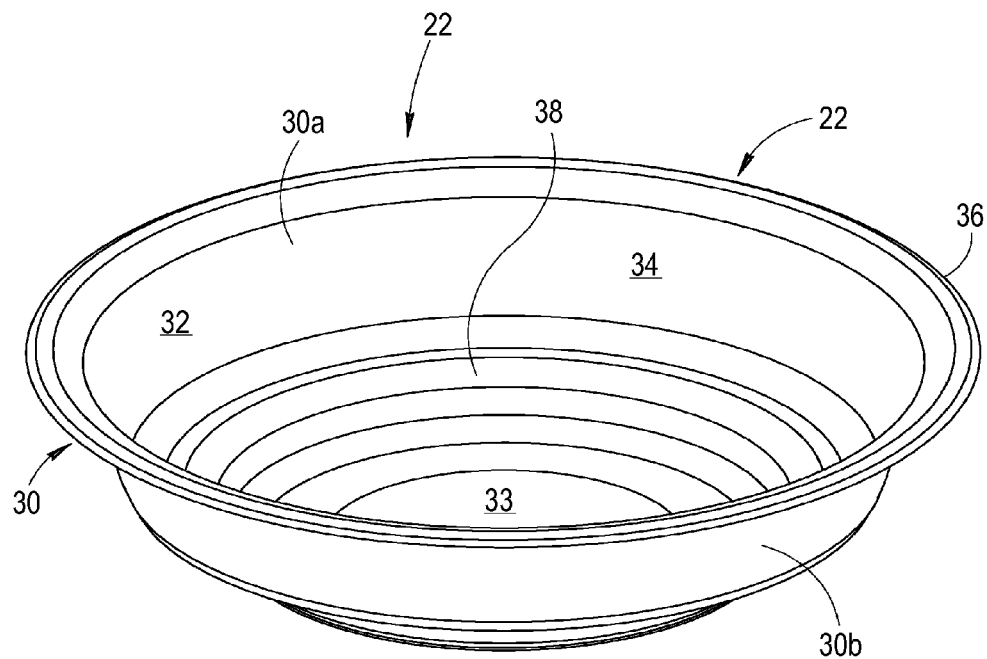
FIG. 2A is a perspective view of the container of the cooking apparatus of FIG. 1A.
Figure 2B:
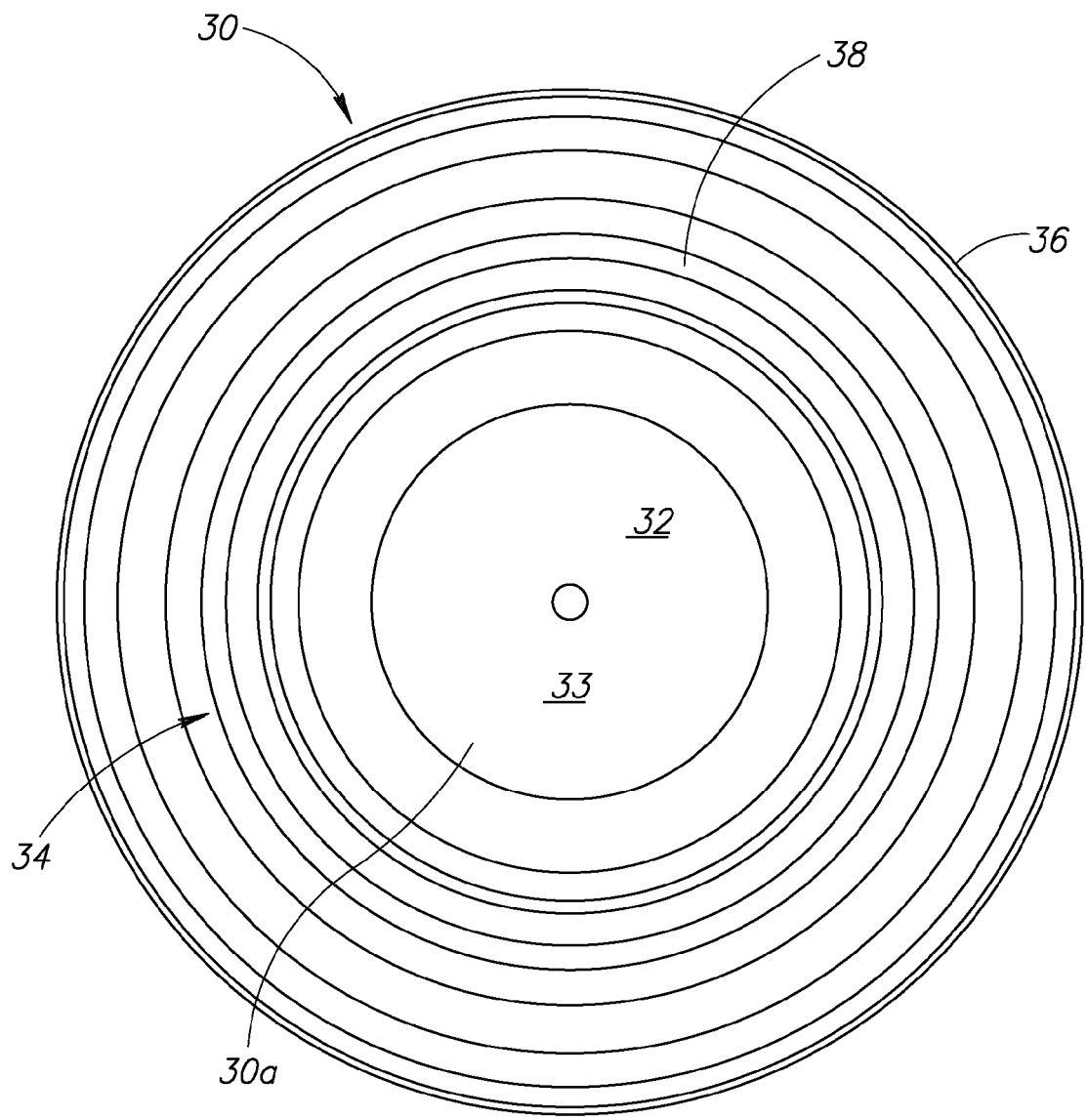
FIG. 2B is a top view of the container of the cooking apparatus of FIG. 1A.
Figure 2C:
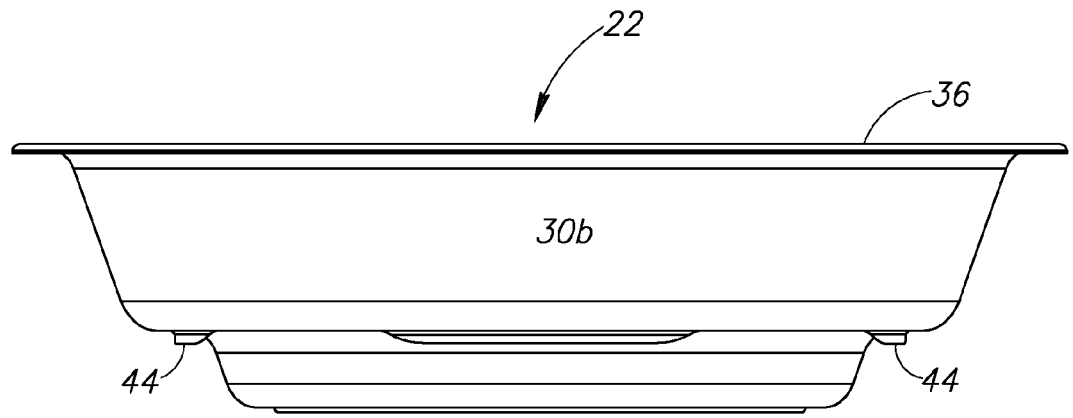
FIG. 2C is a side view of the container of the cooking apparatus of FIG. 1A.

As shown in detail in FIGS. 2A-2C, the container 22 includes a body 30 that is, for example, circular in shape. The body 30 includes an inner side 30a, and an outer side 30b. The body 30 includes a cavity 32, defining the inner side 30a of the body, a base 33, and sidewalls 34. The body 30 is suitable for holding a first food component and receiving the basket 24 in a secure manner.

The container's 22 sidewalls 34 include a shelf portion 38 within its cavity 32. The shelf portion 38 extends along the sidewall 34 and is typically continuous. The sidewalls 34 typically include at least a portion that tapers outwardly, with the entire sidewall 34 typically tapering outwardly from the base 33 to a rim 36, at the opening of cavity 32. The shelf portion 38 provides support for the basket 24 and ensures that the base 63 of the basket 24 is not in direct contact with the base 33 of the container 22 (as shown in FIGS. 1B and 1C). The shelf portion 38 coupled with the sidewalls 34 allow for the basket 24 to be removably received in the container 22 in a secure manner, with minimal movement or play. Alternatively, the container's 22 sidewall 34 may include at least one ledge or protrusion rather than a shelf portion 38 to provide support for the basket 34. Optionally multiple ledges or protrusions may be included to support the basket 34.

As shown in FIG. 2C, the outer side 30b of the body 30, may include protrusion segments 44. These protrusion segments 44 allow for ease in manually gripping the apparatus 20.

Figure 3A:
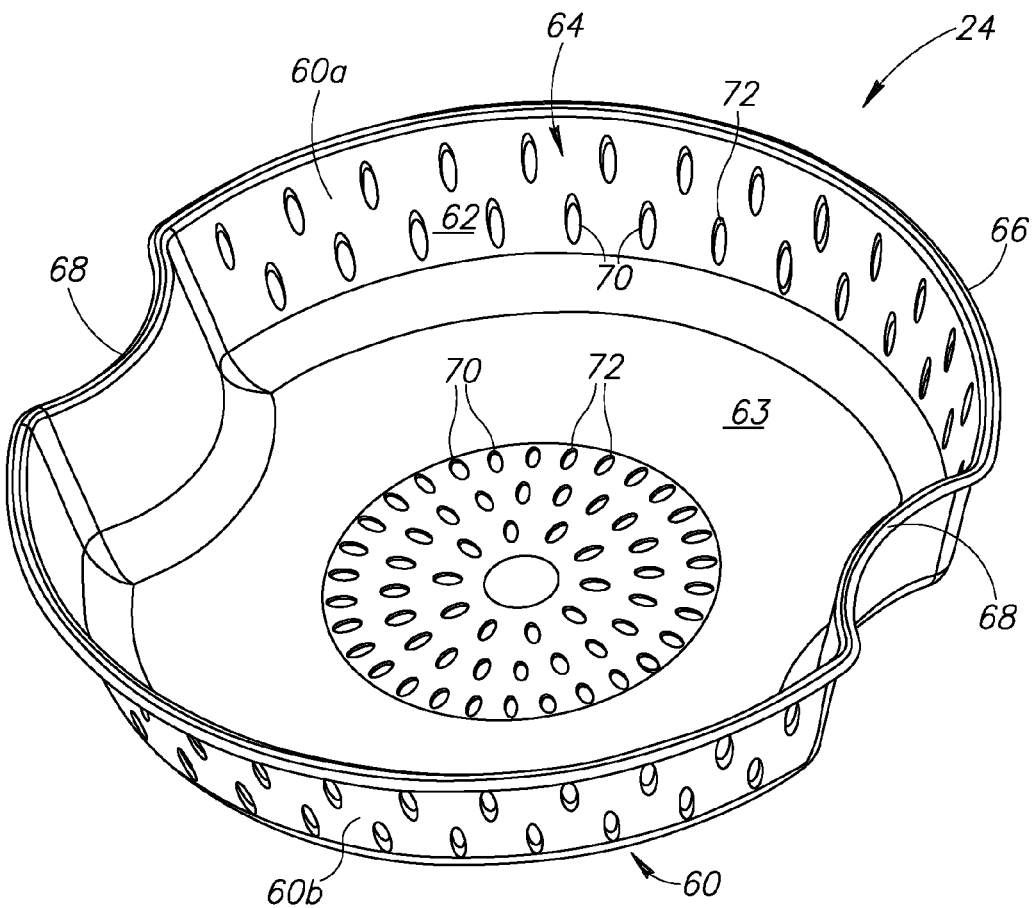
FIG. 3A is a perspective view of the basket of the cooking apparatus of FIG. 1A.
Figure 3B:
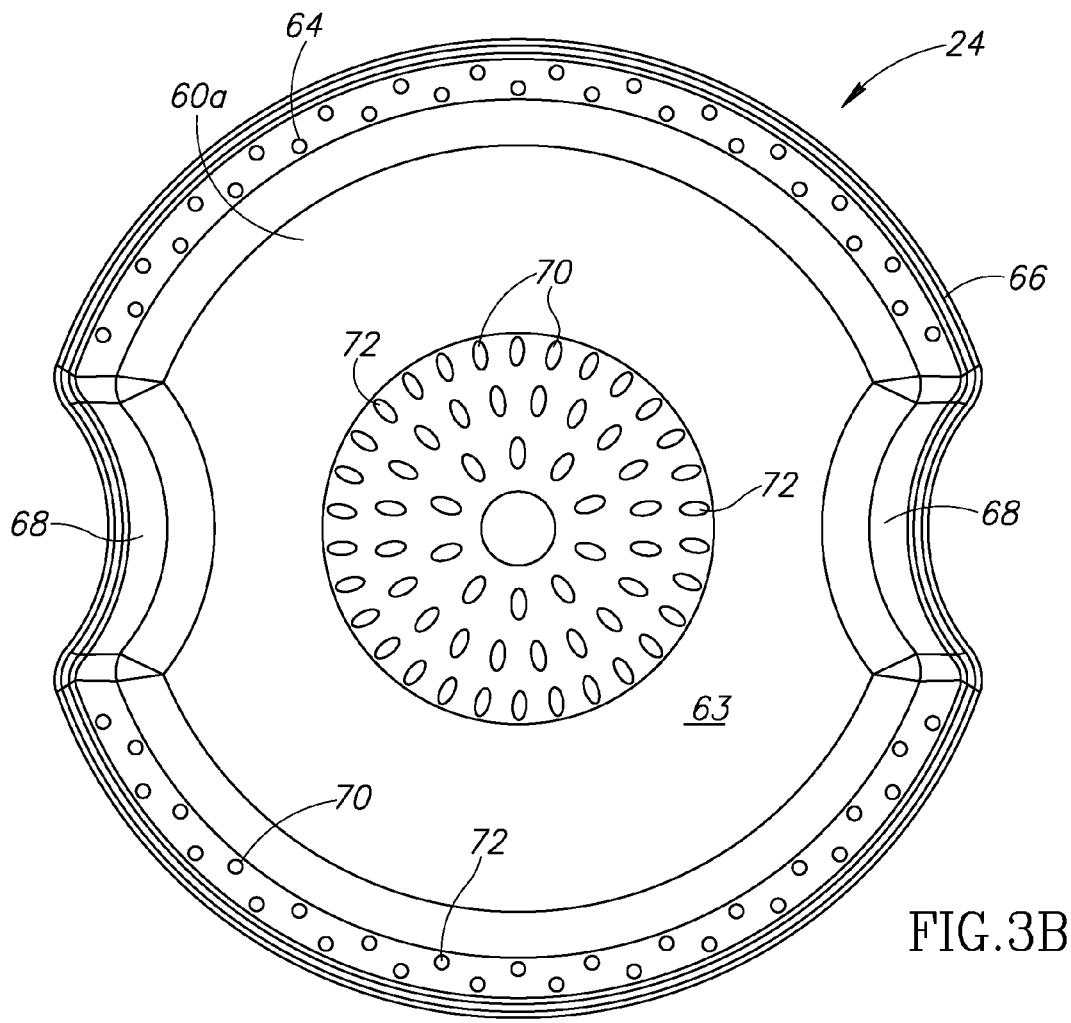
FIG. 3B is a top view of the basket of the cooking apparatus of FIG. 1A.
Figure 3C:
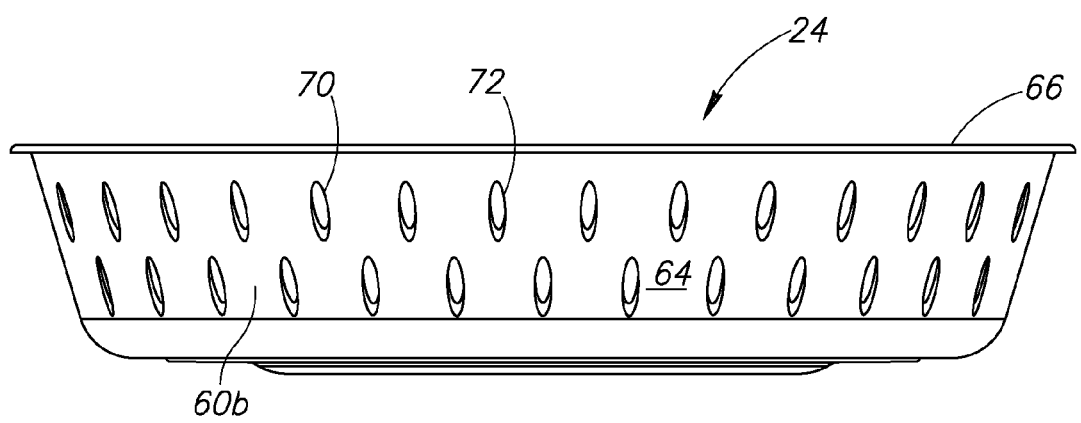
FIG. 3C is a side view of the basket of the cooking apparatus of FIG. 1A.

As shown in detail in FIGS. 3A-3C, the basket 24 includes a body 60 that is, for example, substantially circular in shape, to conform to the shape of the container 22. The body 60 includes an inner side 60a, and an outer side 60b. The body 60 includes a cavity 62, defining the inner side 60a, a base 63, and sidewalls 64. The body 60 is suitable for holding a second food component.

The sidewalls 64 typically include at least a portion that tapers outward, with the entire sidewall 64 typically tapering outward from the base 63, to a rim 66, at the opening of the cavity 62. The sidewalls 64 and rim 66 typically include arcs 68, that are typically rounded inward, into the cavity 62. The arcs 68, are approximately oppositely disposed with respect to each other, and when the basket 24 sits in the container 22, serve as vents for steam, generated in the cavity 32 of the container 22 during cooking. The arcs 68 also provide sufficient portions for manually gripping the basket 24, for its removal from the container 22.

The basket 24 includes a plurality of openings 70. The openings 70 are perforations or bores 72 that extend through the base 63 and through the sidewalls 64. The bores 72 may be of any size or dimension so as to allow steam to pass from the cavity 32 of the container 22 into the basket 24, in order to steam heat (or steam cook) the contents (e.g., the second food component) stored in the cavity 62 of the basket 24, as well as allowing liquid (typically water) to pass from the basket 24 into the container 22. Moreover, the openings 70 are also dimensioned to keep particulate foods, such as rice and the like, including particles thereof, from dropping out of the basket 24 and into the cavity 32 of the container 22. Suitable bore shapes include small, circular, rounded, or oval cylindrical bores, but are not limited thereto.

The openings 70 at the base 63 and sidewalls 64 may be arranged in any desired pattern, provided sufficient amounts of steam are able to reach the basket 24 and there are sufficient openings 70 to allow for the passage of liquid from the basket 24 to the container 22. For example, the openings 70 at the base 63 may be arranged in a series of concentric circles. The openings 70 at the sidewalls 64 may be arranged in a line. Typically, one or more lines of openings 70 may be included in the sidewalls 64 of the basket 24. If a second line of openings 70 is arranged at the sidewalls 64, the second line of openings 70 may be offset with the first line of openings, such that the cylindrical bores 72 of the second line are not directly below the cylindrical bores 72 of the first line.

The body 60, is constructed, such that when the basket 24 is removably received by the container 22, there is sufficient space in the cavity 32 of the container 22, between the base 33 of the container 22 and the base 63 of the basket 24, to accommodate a first food component in both dry or frozen (storage) and cooking (heated) states, without disrupting the seating of the basket 24 in the container 22. Additionally, the body 60 is such that the basket 24 is adequately supported in the container, for example, by the shelf portions 38 (FIG. 1C) and the indent 46 of the rim 36, in order that it hold the second food component, without substantial bending and without allowing the first and second food components to contact one another during storage, prior to the cooking process, or during cooking the cooking process.

Figure 4A:
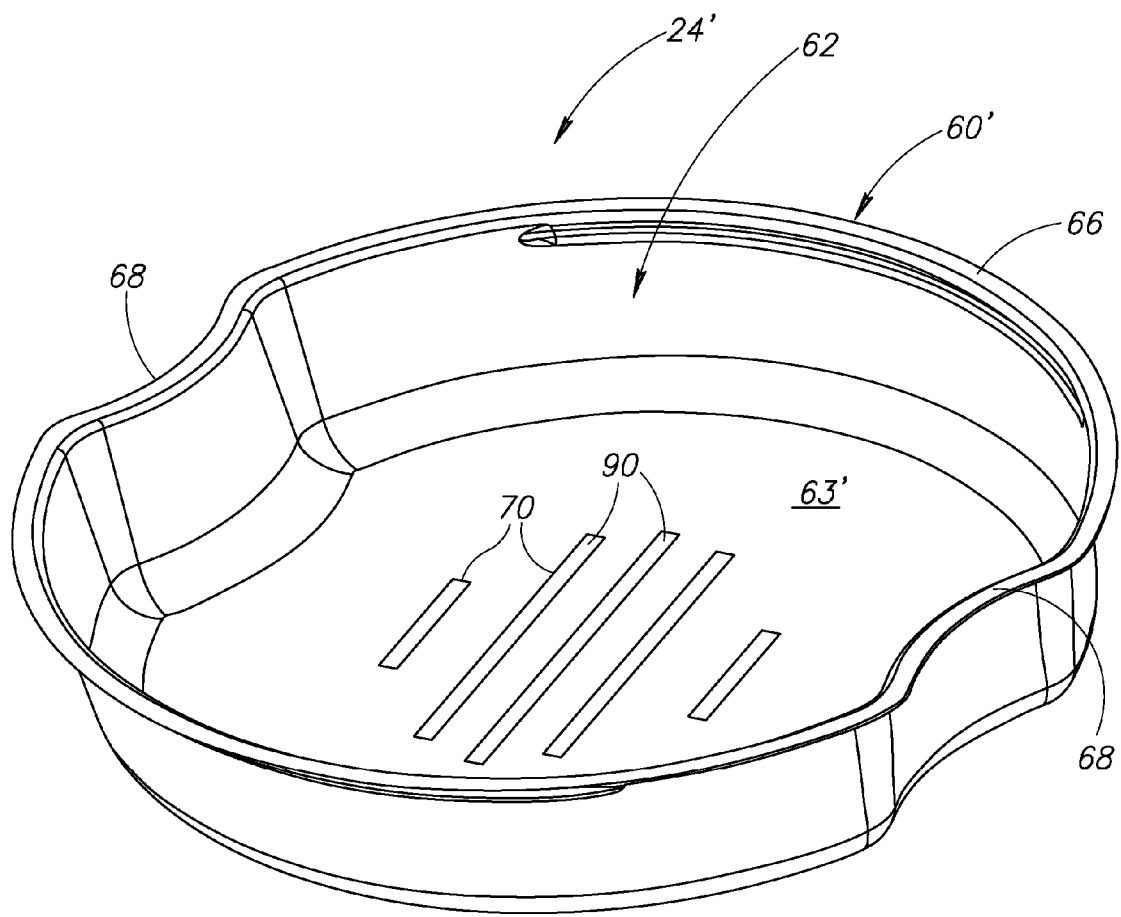
FIG. 4A is a perspective view of an alternate embodiment of the basket of the cooking apparatus of FIG. 1A.
Figure 4B:
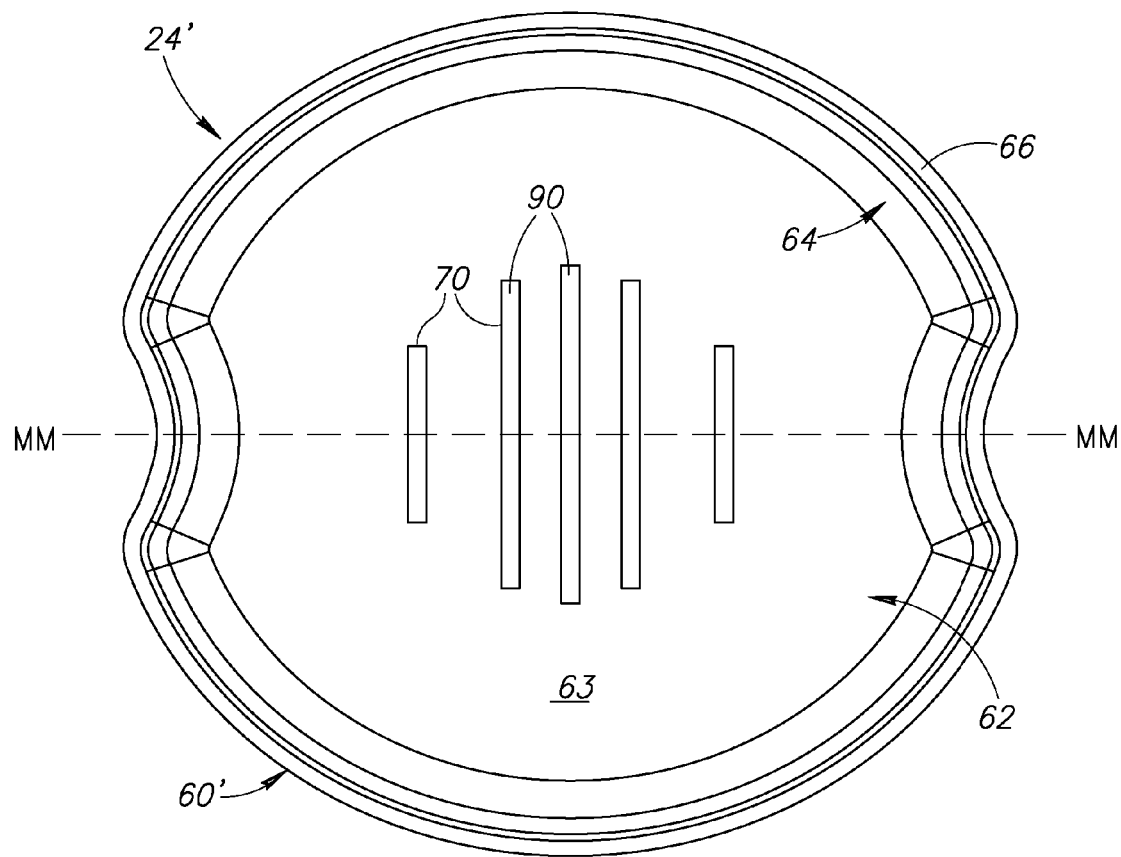
FIG. 4B is a top view of an alternate embodiment of the basket of the cooking apparatus of FIG. 1A.
Figure 4C:
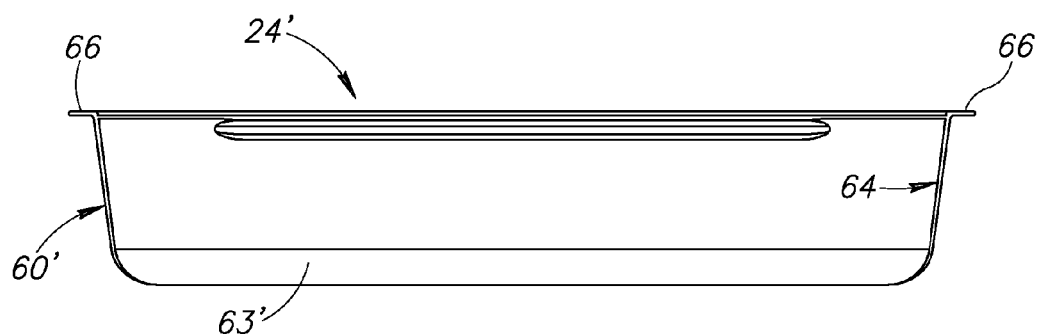
FIG. 4C is a side view of an alternate embodiment of the basket of the cooking apparatus of FIG. 1A.

FIGS. 4A-4C show an alternate basket 24', similar in all aspects of construction and dimensions to the basket 24. Accordingly similar components, as detailed above, are numbered the same as above. Changed or different components are detailed below.

The basket 24', like basket 24, is substantially circular in shape, and designed to sit in the container 22, as detailed above. The basket 24' differs from basket 24, in that the openings 70 may be slits 90, rather than circular, rounded, or oval cylindrical bores 72 as in basket 24. Like the cylindrical bores 72, the slits 90 are dimensioned to facilitate the passage of steam, generated by cooking of the first food component, to enter the basket 24'. The dimensioning of the slits 90 also facilitates the passage of liquid, for example, water, from the basket 24' to the container 22. This dimensioning keeps particulate foods, such as rice and the like, including particles thereof, from dropping out of the basket 24' and into the cavity 32 of the container 22.

The slits 90 are typically rectangular in shape, and extend through the base 63'. They are typically arranged in a parallel alignment with respect to each other. The slits 90 are typically oriented perpendicular to the longitudinal axis MM of the base 63'. Alternatively, the slits 90 may also be oriented parallel to the longitudinal axis MM of the base 63'.

FIGS. 5A-9C show an alternate embodiment of the apparatus of the present invention. Apparatus 120 is of similar constructions and materials to apparatus 20 detailed above. Components in apparatus 120, that are similar to those in apparatus 20, FIGS. 1A-3C, are numbered so as to be increased by "100." The components increased by "100" that are not described below, function similarly to the corresponding components for apparatus 20. Different components, including components that function differently, are described below.

Figure 5A:
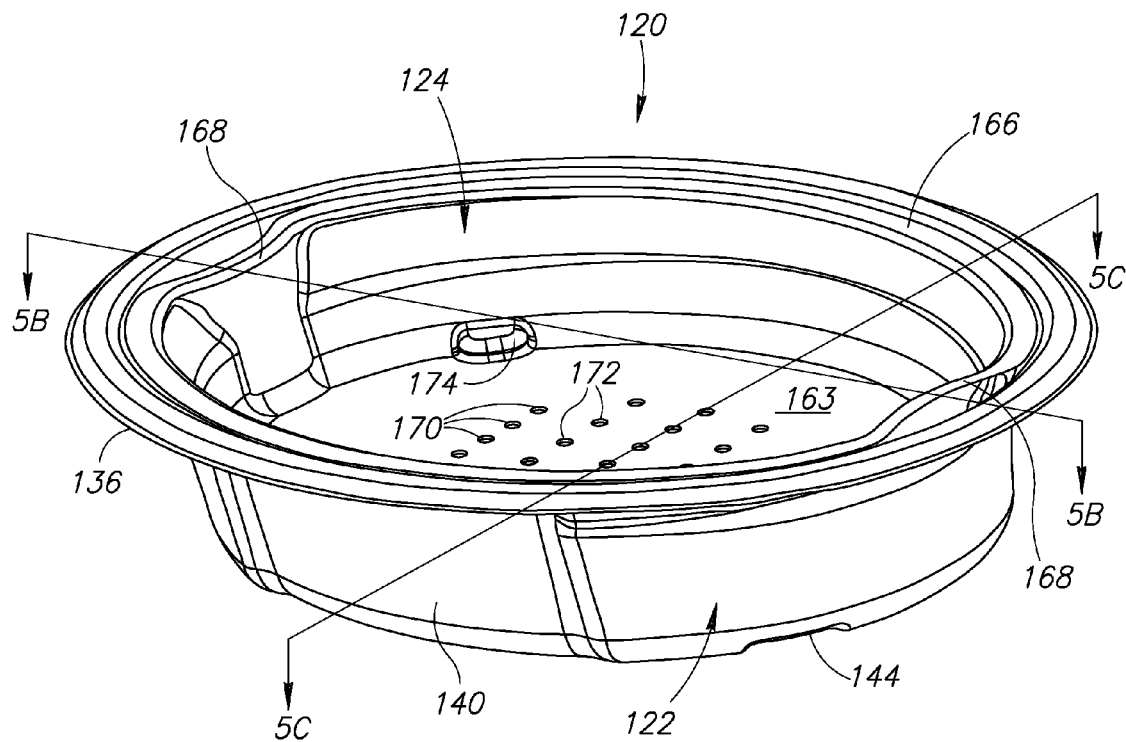
FIG. 5A is a perspective view of a cooking apparatus in accordance with an alternate embodiment of the present invention.

As stated above, the apparatus of the present invention may be of any desired shape. As shown in FIG. 5A, the apparatus 120 is such that it is of an oval shape. The apparatus 120 is formed of a container 122, that is oval in shape, and a basket 124, for sitting in the container 122, in a secure manner, as detailed above, for the container 22 and basket 24, 24' of apparatus 20.

Figure 5B:
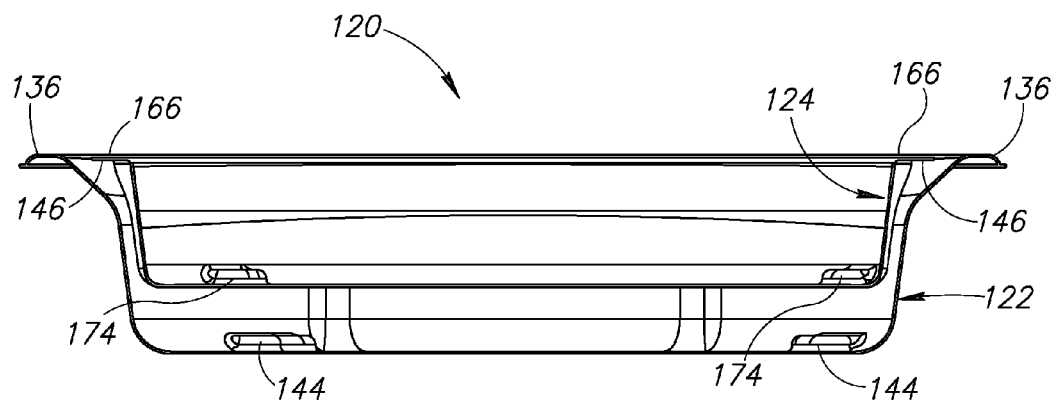
FIGS. 5B and 5C are side cross-sectional views of the cooking apparatus of FIG. 5A, taken along lines 5B-5B and 5C-5C, respectively.
Figure 5C:
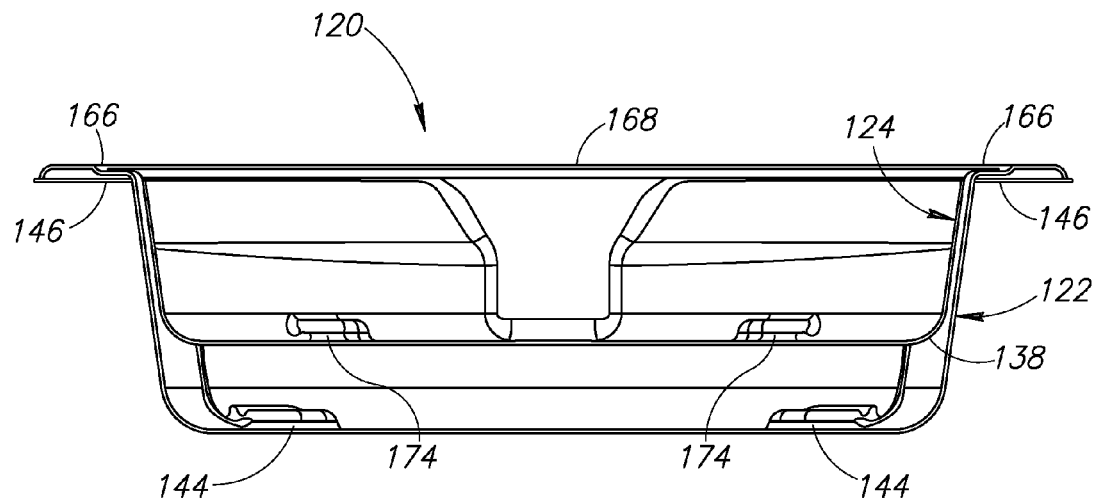
Figure 6A:
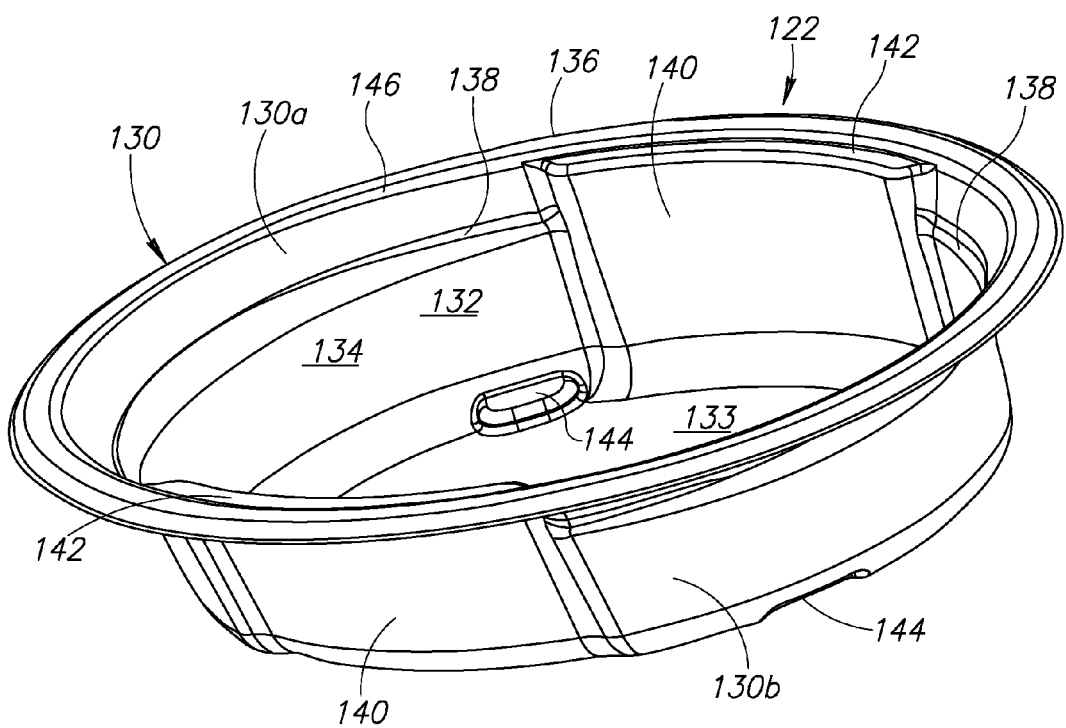
FIG. 6A is a perspective view of the container of the cooking apparatus of FIG. 5A.
Figure 6B:
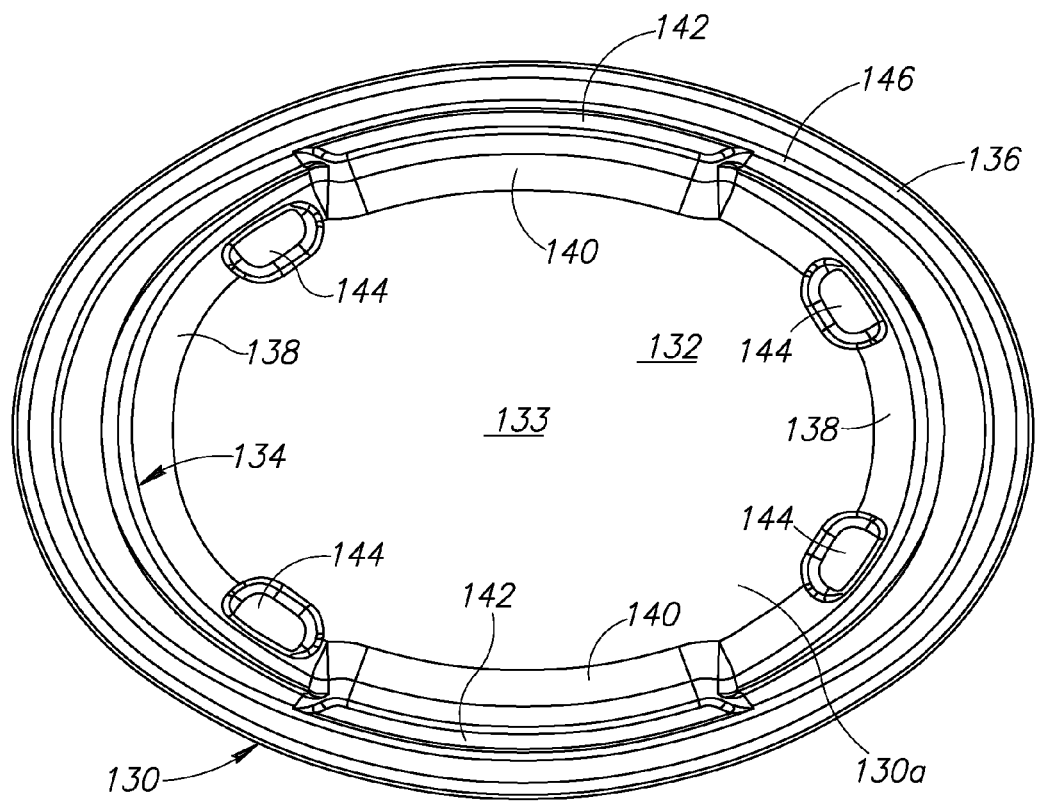
FIG. 6B is a top view of the container of the cooking apparatus of FIG. 5A.
Figure 6C:
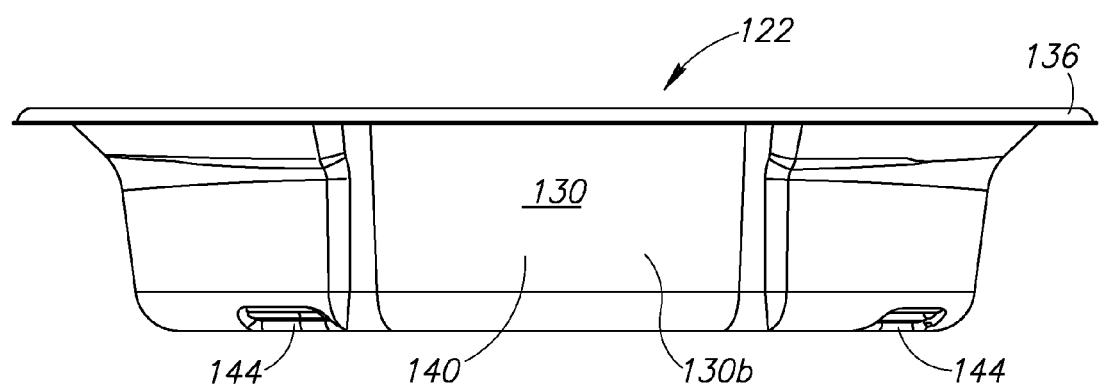
FIG. 6C is a side view of the container of the cooking apparatus of FIG. 5A.

As shown in FIGS. 6A-6C, the container 122 includes shelf portions 138, at an intermediate height along the sidewalls 134 that are typically discontinuous from each other. Dividing portions 140, that extend inward into the cavity 132, separate the shelf portions 138 from each other. The dividing portions 140 extend from the base 133 to ledges 142, proximate to the rim 136. The shelf portions 138 and the dividing portions 140 are typically symmetric and oppositely disposed with respect to each other. The shelf portions 138 provide support for the basket 124 (as shown in FIGS. 5B and 5C). The dividing portions 140 are such that they provide rigidity to the container 122. The rim 136 of the container 122 also includes an indent 146, similar to the indent 46, along the inner periphery of the rim 136. The rim serves in maintaining a secure fit of the basket 124 in the container 122.

Figure 7A:
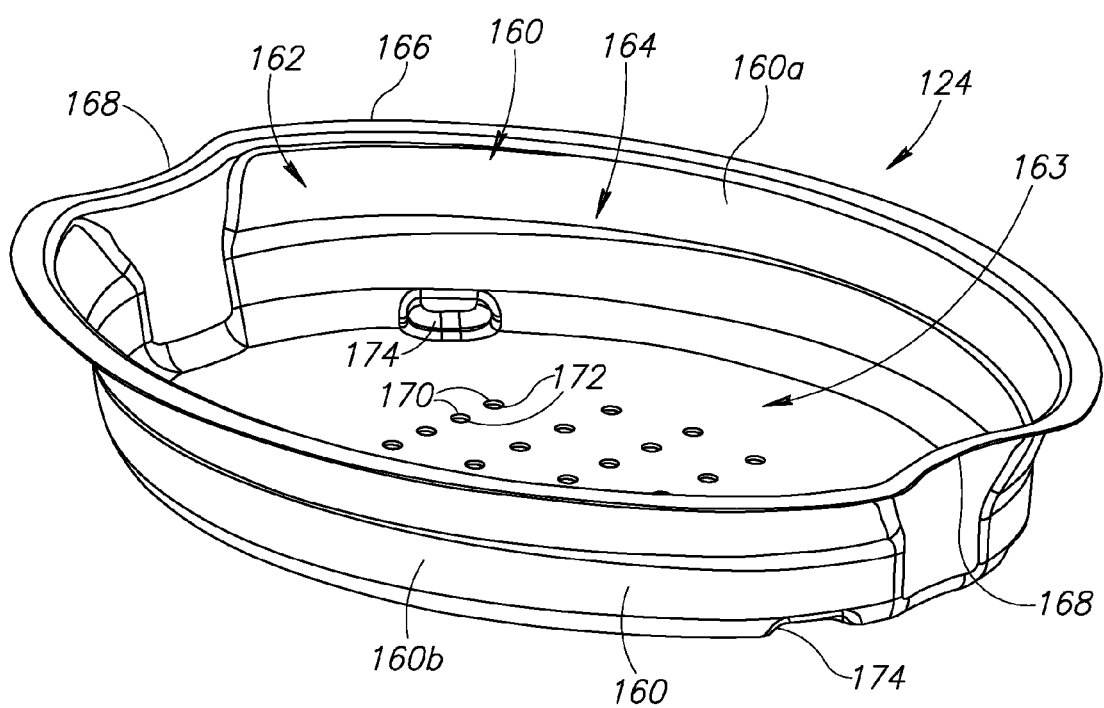
FIG. 7A is a perspective view of the basket of the cooking apparatus of FIG. 5A.
Figure 7B:
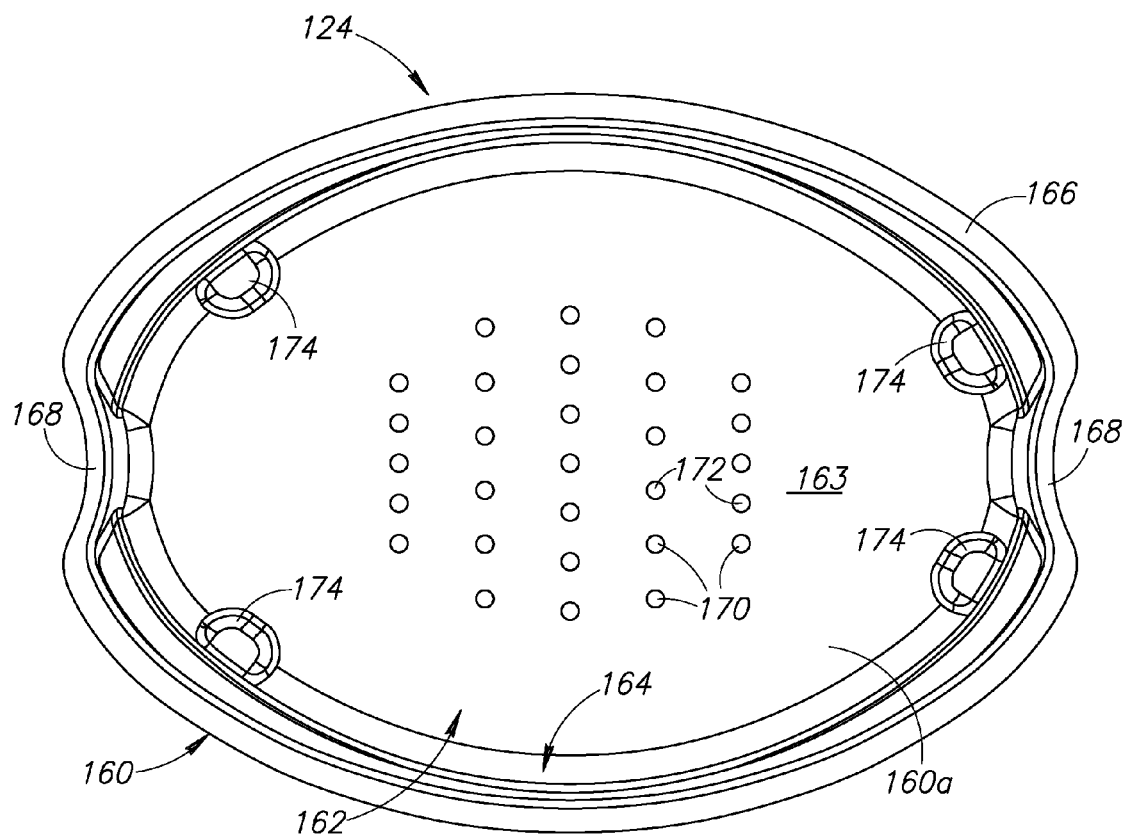
FIG. 7B is a top view of the basket of the cooking apparatus of FIG. 5A.
Figure 7C:
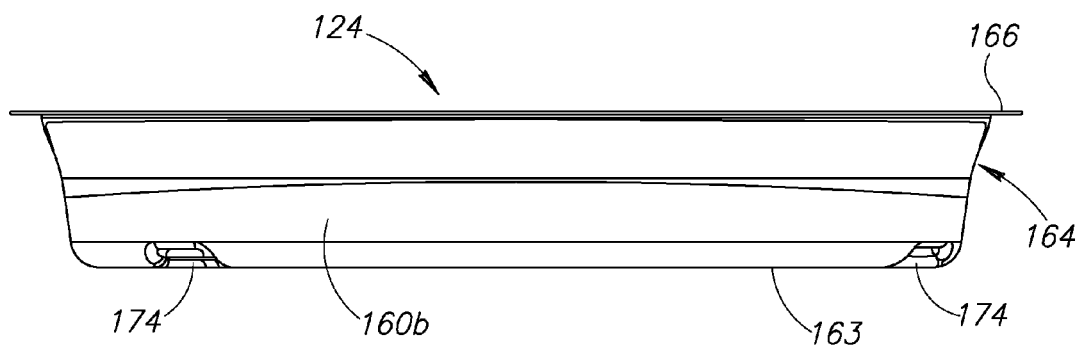
FIG. 7C is a side view of the basket of the cooking apparatus of FIG. 5A.

As shown in FIGS. 7A-7C, the basket 124 is of a substantial oval shape, but includes arcs 168, similar to the arcs 68, to allow for venting of steam as well as ease of gripping, by fingers. The basket 124 includes openings 170 of cylindrical bores 172, arranged from example in lines. Alternatively, other arrangement of the openings 170 are also permissible, such as concentric circles. The openings 170 (formed of cylindrical bores 172) function similarly to the openings 70 (formed of cylindrical bores 72) of the basket 24, as detailed above.

The outer side 160b of the body 160, may include protrusion segments 174. These protrusion segments 174 allow for ease of use in manually gripping the basket 124.

Figure 8A:
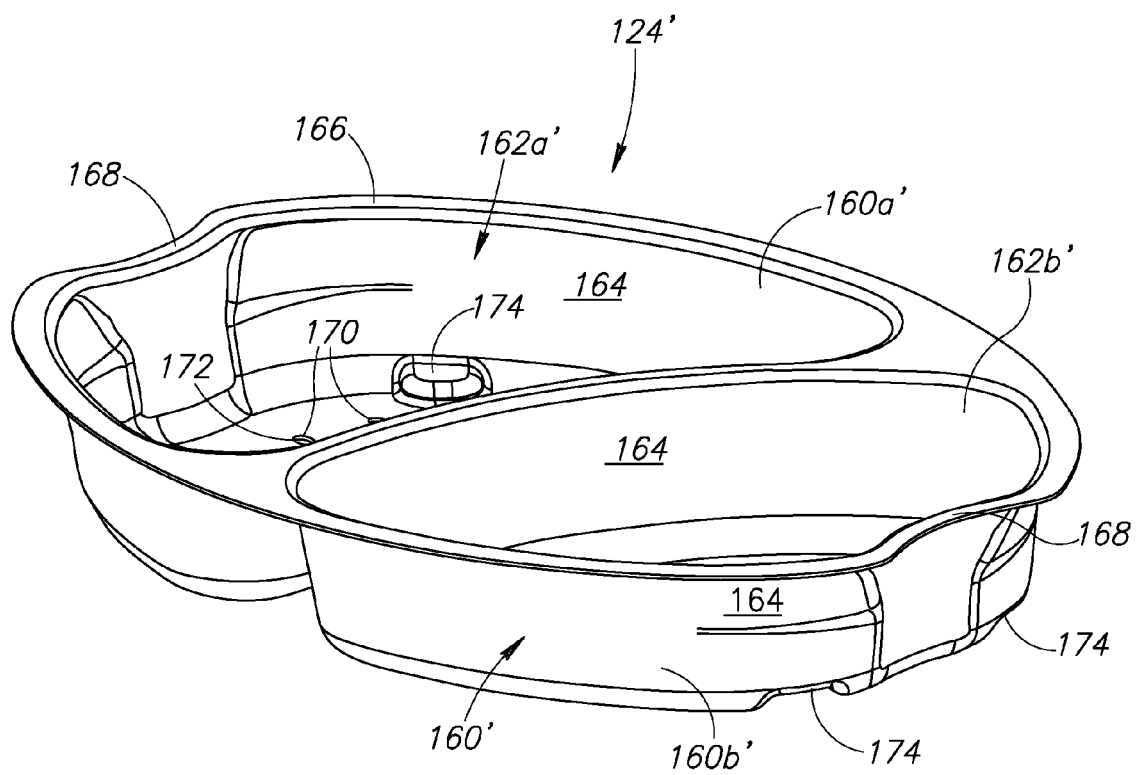
FIG. 8A is a perspective view of an alternate embodiment of the basket of the cooking apparatus of FIG. 5A.
Figure 8B:
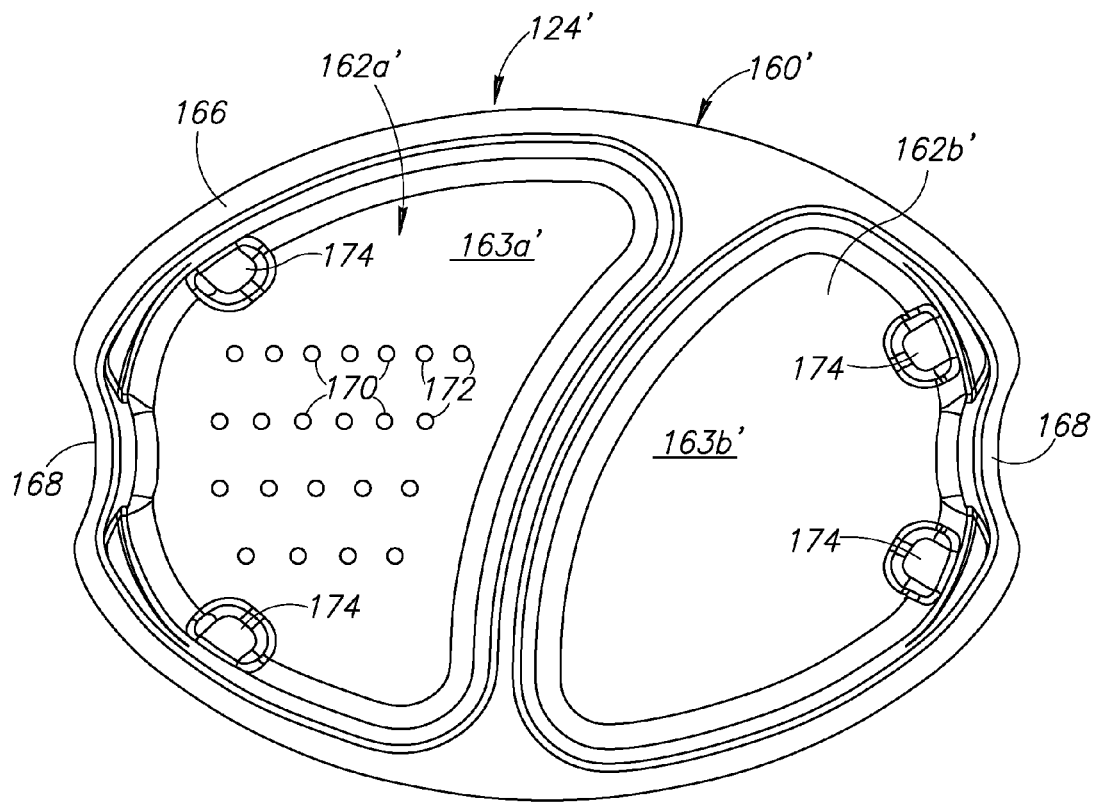
FIG. 8B is a top view of the another alternate embodiment of the basket of the cooking apparatus of FIG. 5A.
Figure 8C:
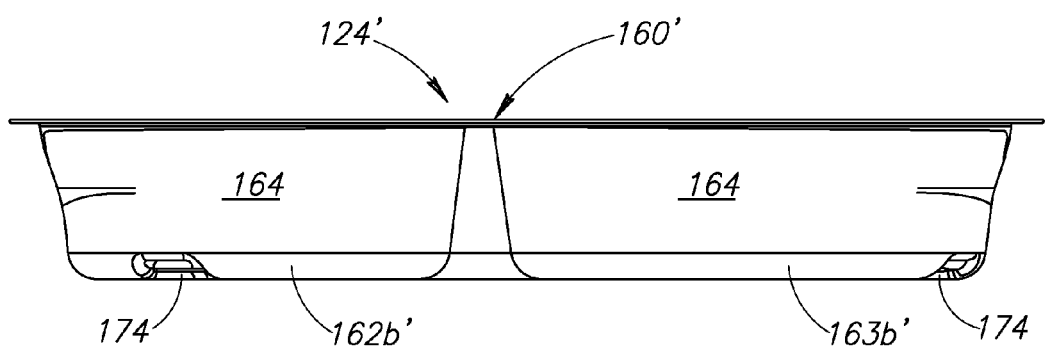
FIG. 8C is a side view of an another alternate embodiment of the basket of the cooking apparatus of FIG. 5A.

FIGS. 8A-8C show an alternate basket 124', similar in all aspects of construction to basket 124, except where indicated. The basket 124', like basket 124, is substantially oval in shape, and designed to sit in the container 122, as detailed above. The basket 124' differs from the basket 124, in that the body 160' is divided into two cavities 162a', 162b', for holding separate food components. Additionally, the base 163a' of the first cavity 162a' includes openings 170, for example, cylindrical bores 172, as detailed above. The base 163b' of the second cavity 162b' is solid, whereby the food component therein is primarily heated by the heating source.

Figure 9A:
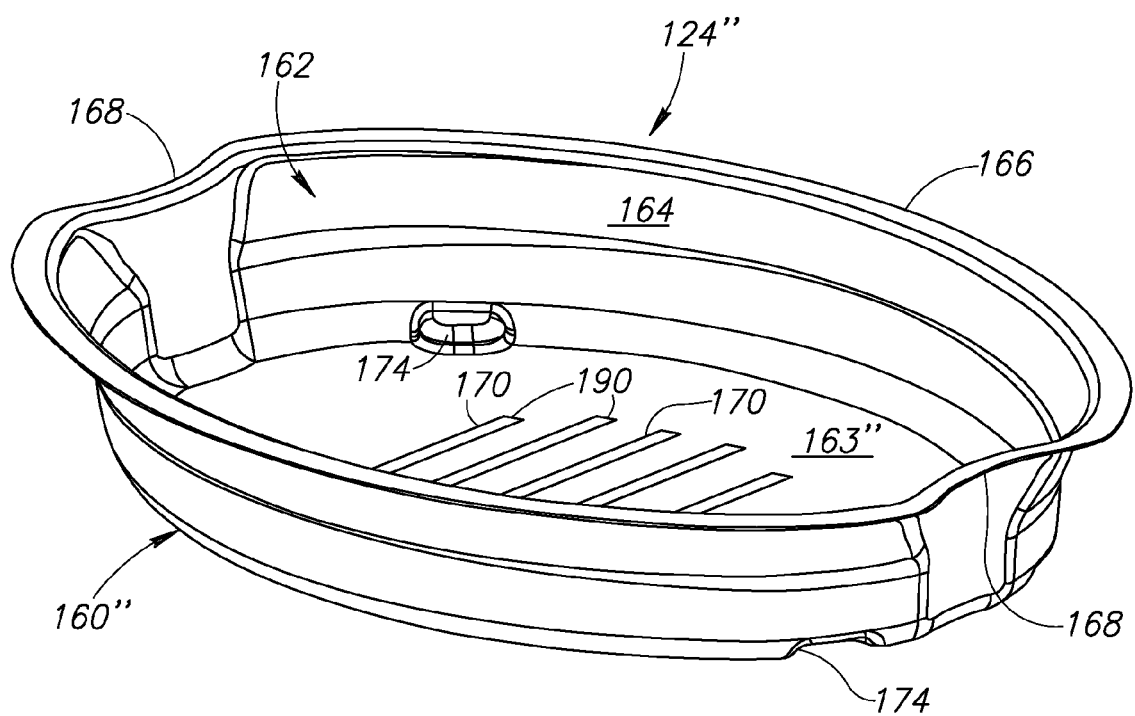
FIG. 9A is a perspective view of another alternate embodiment of the basket of the cooking apparatus of FIG. 5A.
Figure 9B:
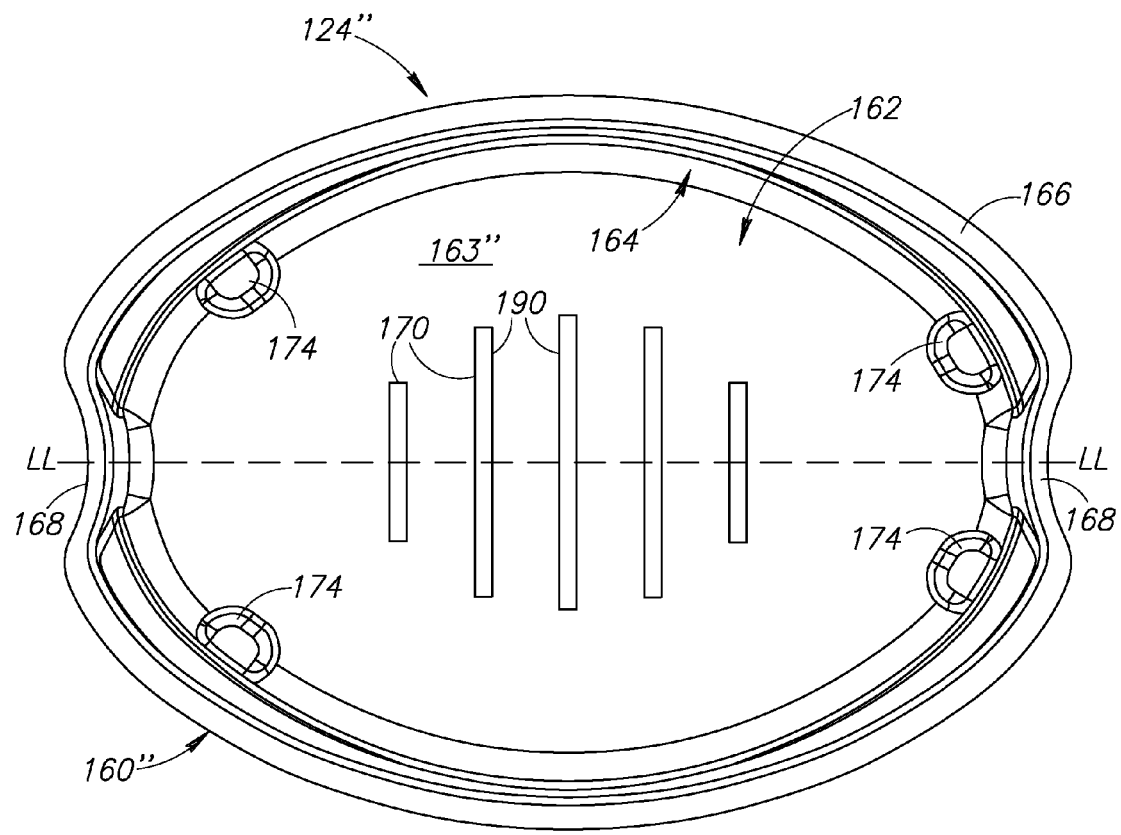
FIG. 9B is a top view of another alternate embodiment of the basket of the cooking apparatus of FIG. 5A.
Figure 9C:
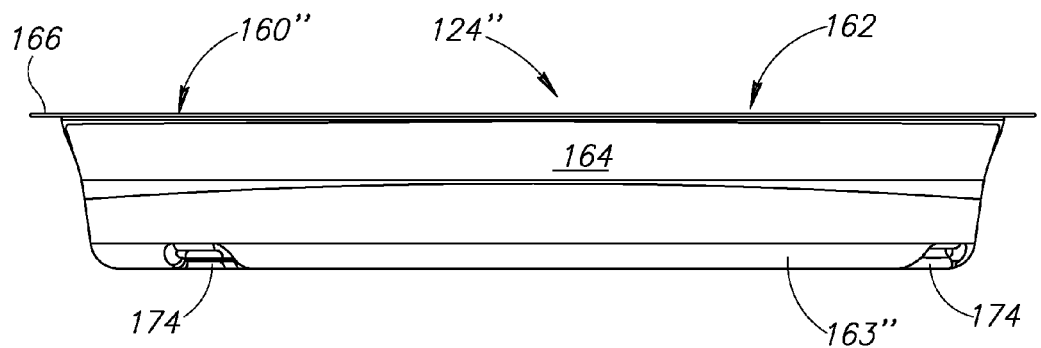
FIG. 9C is a side view of another alternate embodiment of the basket of the cooking apparatus of FIG. 5A.

FIGS. 9A-9C show another alternate basket 124", similar in all aspects of construction and dimensions to the basket 124. Accordingly similar components, as detailed above, are numbered the same as above. Changed or different components are detailed below.

The basket 124", like basket 124, is substantially oval in shape, and designed to sit in the container 122, as detailed above. The basket 124" differs from basket 124, in that the openings 170 may be slits 190.

The slits 190 are similar in construction and function to the slits 90 of the basket 24, as detailed above. The slits 190 are cut into and extend through the base 163" of the body 160". They are typically arranged in a parallel alignment with respect to each other. The slits 190 are typically oriented perpendicular to the longitudinal axis LL of the base 163". Alternatively, the slits 90 may also be oriented parallel to the longitudinal axis LL of the base 163".

The containers 22, 122 and baskets 24, 24', 124, 124', 124" are, for example, made of polymers, such as Polypropylene (PP) (e.g., Co-polymer Polypropylene), Crystallized Polyethylene Terepthalate (CPET), or any other microwave and food safe non-toxic material. The containers 22, 122 and baskets 24, 24', 124, 124', 124" are, for example, formed by conventional polymer forming and working techniques. Suitable forming and working techniques include injection molding, rotational molding, and the like, as well as thermoforming. The containers 22, 122 and baskets 24, 24', 124, 124', 124" are suitable for refrigerated storage, freezer storage, and subsequent heating without substantial deformation.

The apparatuses 20, 120, in particular, the containers 22, 122 and baskets 24, 24', 124, 124', 124" are typically of dimensions to ensure that during the cooking process the second food component is uniformly steam cooked. In addition, the apparatuses 20, 120, in particular, the containers 22, 122 and baskets 24, 24', 124, 124', 124" are of dimensions to fit within a household microwave oven, with sufficient space remaining. For example, the containers 22 and 122 may be of circular shape and with a diameter of from about 4 to about 12 inches. Alternatively, the containers 22 and 122 may be of rectangular shape, with dimensions of from about 3 to about 6 inches in width to about 7 to about 12 inches in length. In addition, the containers 22 and 122 may include 1 to 6 servings, preferably 2 to 4 servings. Other dimensioning and/or shapes for the apparatuses 20, 120, containers 22, 122 and baskets 24, 24', 124, 124', 124" are also possible, to accommodate different packages, cartons, or sleeves, that hold the apparatus prior to its use, as well as the internal cooking chambers of microwave ovens, high energy cooking apparatus, and the like. Similarly, other serving sizes are also possible to accommodate consumer demand.

The apparatuses 20, 120 are such that they may be covered by a sheet of barrier material (e.g., transparent, translucent, or opaque) continuously sealed to the rim 36 of the containers 22 and 122, but also could be sealed to the rim 66, 166 of the baskets 24, 24', 124, 124', 124". This sheet of barrier material is made of a material that is suitable to withstand oven temperatures during cooking and is moisture-impervious. Suitable materials include polymers, such as polypropylene and polyethylene, among others. The sheet of barrier material is sealed to the rim using any method generally known in the art. The sheet of barrier material is sealed to the rim to prevent substantial bulging or expansion of the sheet material during the cooking process. In particular, the seal is such as to allow the release of some pressure build up inside the container while maintaining uniform heating and cooking of the food products therein.

While preferred embodiments of the present invention have been described, so as to enable one of skill in the art to practice the present invention, the preceding description is intended to be exemplary only. It should not be used to limit the scope of the invention, which should be determined by reference to the following claims.

What is claimed is:

1. A cooking apparatus comprising:
   a container having a base, sidewalls tapering outwardly and extending vertically from the base of the container to a rim, and a shelf formed in the sidewalls of the container between the base of the container and the rim of the container;
   a basket removably received by the container, the basket including a base of the basket and sidewalls of the basket extending from the base of the basket to a rim that is disposed entirely below a top point of the rim of the container when the basket is received by the container to define a first volume, with a plurality of openings extending through at least one of a bottom surface of the base of the basket and the sidewalls of the basket, wherein the bottom surface of the base of the basket rests on the shelf formed in the sidewalls of the container when the basket is received by the container to define a second volume between the base of the container and the base of the basket;
   a first food component disposed in the container at least substantially within the second volume; and
   a second food component disposed in the basket at least substantially within the first volume.

2. The apparatus of claim 1, wherein the apparatus is heated in an oven selected from the group consisting of a conventional, convection, and microwave oven.

3. The apparatus of claim 1, wherein the first food component is selected from the group consisting of liquids, gels, partially liquid, partially gelatinous mixtures, and mixtures thereof.

4. The apparatus of claim 3, wherein the second food component is selected from the group consisting of starches and proteins.

5. The apparatus of claim 1, wherein the basket further comprises an inwardly-oriented arc in the sidewalls of the basket perpendicular to the base of the basket.

6. The apparatus of claim 1, further comprising a sheet of barrier material continuously sealed to the rim of the container.

7. The apparatus of claim 6, wherein the sheet of barrier material is moisture-impervious.

8. The apparatus of claim 7, wherein the sheet of barrier material is a polypropylene or a polyethylene sheet.

9. The apparatus of claim 1, wherein the first food component and the second food component remain separate during the cooking process.

10. The apparatus of claim 1, wherein the basket further comprises:
    a first cavity for holding the second food component; and
    a second cavity for holding a third food component.

11. The apparatus of claim 1, wherein the apparatus is suitable for refrigerated storage, freezer storage, and subsequent heating.

12. A cooking apparatus comprising:
    a container for holding a first food component, the container having a base and sidewalls tapering outwardly and extending vertically from the base of the container to a rim, and an inwardly projecting shelf formed in the sidewalls of the container between the base of the container and the rim of the container, the inwardly projecting shelf continuously disposed along the sidewalls of the container;

a basket for holding a second food component, the basket removably received by the container and including a base of the basket, sidewalls of the basket extending from the base of the basket to a rim of the basket to define a first volume, and a plurality of openings extending through at least one of the base of the basket and the sidewalls of the basket, wherein the inwardly projecting shelf of the container supports the base of the basket so that the basket is separated from the base of the container to define a second volume between the base of the container and the base of the basket to hold the first food component; and a sheet of barrier material sealed to the rim of the container.

13. The apparatus of claim 12, wherein the apparatus is heated in an oven selected from the group consisting of a conventional, convection, and microwave oven.

14. The apparatus of claim 12, wherein the apparatus is heated for a time sufficient to boil the first food component thereby generating steam that passes through the openings at the base of the basket and uniformly steam cooks the second food component.

15. The apparatus of claim 1, wherein the basket is configured to be removed from the container following heating of the first and second food components to allow the second food component to be emptied into the container with the first food component.

16. The apparatus of claim 1, wherein the shelf comprises at least one of a shelf portion, a ledge, or a protrusion.

17. The apparatus of claim 12, wherein the basket is configured to be removed from the container following heating of the first and second food components to allow the second food component to be emptied into the container with the first food component.

* * * * *